(12) United States Patent
Tsutsumizaki et al.

(10) Patent No.: US 11,325,038 B2
(45) Date of Patent: May 10, 2022

(54) GAME DEVICE, RECORDING MEDIUM, AND GAME SYSTEM

(71) Applicant: KONAMI DIGITAL ENTERTAINMENT CO., LTD., Tokyo (JP)

(72) Inventors: Yota Tsutsumizaki, Tokyo (JP); Yuji Kaine, Tokyo (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 55 days.

(21) Appl. No.: 16/804,959

(22) Filed: Feb. 28, 2020

(65) Prior Publication Data

US 2020/0197809 A1  Jun. 25, 2020

Related U.S. Application Data

(63) Continuation of application No. PCT/JP2018/034015, filed on Sep. 13, 2018.

(30) Foreign Application Priority Data

Sep. 14, 2017  (JP) .............................. JP2017-177170

(51) Int. Cl.
*A63F 13/5375* (2014.01)
*A63F 13/35* (2014.01)
(Continued)

(52) U.S. Cl.
CPC .......... *A63F 13/5375* (2014.09); *A63F 13/35* (2014.09); *A63F 13/533* (2014.09);
(Continued)

(58) Field of Classification Search
CPC .... A63F 13/5375; A63F 13/35; A63F 13/533; A63F 13/847; A63F 13/87; A63F 2300/572
(Continued)

(56) References Cited

U.S. PATENT DOCUMENTS

2008/0096622 A1* 4/2008 Terada .................. A63F 13/573
463/2
2009/0104990 A1* 4/2009 Tsujino ............... A63F 13/5255
463/32
(Continued)

FOREIGN PATENT DOCUMENTS

JE  2011-053779 A  3/2011
JP  2007-135823 A  6/2007
(Continued)

OTHER PUBLICATIONS

Mach in e Communication dated Jun. 9, 2020, from the Japanese Patent Office in Application No. 2017-177170.
(Continued)

*Primary Examiner* — Allen Chan
(74) *Attorney, Agent, or Firm* — Sughrue Mion, PLLC

(57) ABSTRACT

A non-transitory computer readable recording medium having recorded thereon a program for a game device having a processor, in which the program causes the processor to: identify a game element in a virtual space, or a position of the game element in the virtual space, based on an indicated direction in the virtual space in accordance with an operation input made by a user; and generate first information to enable a position designation image to be displayed on a display unit, the position designation image being to representative of the position in the virtual space depending on an identification result obtained by identifying the game element or the position of the game element.

19 Claims, 13 Drawing Sheets

(51) Int. Cl.
  *A63F 13/533* (2014.01)
  *A63F 13/847* (2014.01)
  *A63F 13/87* (2014.01)

(52) U.S. Cl.
  CPC ............ *A63F 13/847* (2014.09); *A63F 13/87* (2014.09); *A63F 2300/572* (2013.01)

(58) Field of Classification Search
  USPC .......................................................... 463/31
  See application file for complete search history.

(56) References Cited

U.S. PATENT DOCUMENTS

| | | | | |
|---|---|---|---|---|
| 2009/0280879 | A1* | 11/2009 | Takahashi | A63F 13/812 463/3 |
| 2010/0113147 | A1* | 5/2010 | Chosogabe | A63F 13/53 463/30 |
| 2011/0172017 | A1* | 7/2011 | Takahashi | A63F 13/06 463/39 |
| 2013/0090165 | A1* | 4/2013 | Shikata | A63F 13/843 463/31 |
| 2015/0258442 | A1* | 9/2015 | Yudo | A63F 13/58 463/31 |

FOREIGN PATENT DOCUMENTS

| | | |
|---|---|---|
| JP | 2012-249930 A | 12/2012 |
| JP | 2013-158456 A | 8/2013 |
| JP | 2016-016146 A | 2/2016 |

OTHER PUBLICATIONS

International Search Report dated Dec. 18, 2018 in International Application No. PCT/JP2018/034015.

Written Opinion of the International Searching Authority dated Dec. 18, 2018 in International Application No. PCT/JP2018/034015.

Office Action dated Jan. 9, 2018 in Japanese Application No. 2017-177170.

Office Action dated May 29, 2018 in Japanese Application No. 2017-177170.

Office Action dated Sep. 18, 2018 in Japanese Application No. 2017-177170.

Office Action dated Sep. 17, 2019 in Japanese Application No. 2017-177170.

Office Action dated Jan. 7, 2020 in Japanese Application No. 2017-177170.

Muraoka, Takanori, "Mabinogi Official Guide, Jun. 2005," Jun. 23, 2005, pp. 1, 48-51, 128, 1st edition, Koei Co., Ltd. (6 pages total).

Communication dated Aug. 13, 2021 by the Korean Patent Office in Korean Application No. 10-2020-7010281.

Notice of Reasons for Refusal dated Jul. 27, 2021 by the Japanese Patent Office in Japanese Application No. 2018-233255.

"Earth Defense Force 4.1, The Shadow of New Despair", Weekly Famitsu, No. 1373, , 2015, vol. 30, No. 15, Consecutive No. 1373, pp. 66-69 (8 pages total).

"Gravity Daze 2, Online Manual (Way Back Machine)", 2017, Searched on Jul. 8, 2021, Retrieved from: URL: <https://web.archive.org/web/20170125120042/http://playstation-doc.net/j/gravitydaze2/screen.html> (1 page total).

"Fellowship Play Guide Start Guide Column [Lv.1] 8.", 2017, Searched on Jul. 8, 2021, Retrieved from URL: <https://fellowship.amebaownd.com/posts/2204877/> (6 pages total).

Notice of Reasons for Refusal dated Mar. 8, 2022 by the Japanese Patent Office in Japanese Application No. 2018-233255.

"Ghost in the Shell S.A.C. Online" large update "2nd DIVE", including mounting an armed system and changes in skills specifications, implementation!, Jun. 14, 2017, [search on Feb. 24, 2022] Internet <URL: https://www.famitsu.com/news/201706/14135459.html>.

\* cited by examiner

FIG. 4

TBL2

GAME CHARACTER MANAGEMENT INFORMATION

| GAME CHARACTER ID | USER ID | TEAM ID | CHARACTER TYPE ID | MARKER ADDITION TARGET CHARACTERISTICS INFO | POSITION | DIRECTION | REMAINING HIT POINTS | ACTION INFO |
|---|---|---|---|---|---|---|---|---|
| c001 | u001 | t001 | s101 | 1 | (231, 451, 102) | 60 deg. | 500 | ATTACK |
| c002 | u012 | t001 | s102 | 1 | (245, 453, 036) | 190 deg. | 260 | STAY |
| c003 | Null | t002 | s001 | 2 | (269, 423, 045) | 95 deg. | 120 | MOVE |
| c004 | Null | t002 | s001 | 2 | (273, 438, 046) | 92 deg. | 120 | MOVE |
| c005 | Null | t002 | s002 | 2 | (195, 259, 056) | 76 deg. | 950 | MOVE |
| ... | ... | ... | ... | ... | ... | ... | ... | ... |

FIG. 5

| GAME OBJECT ID | GAME OBJECT MANAGEMENT INFORMATION ||||| TBL3 |
|---|---|---|---|---|---|
| | GAME OBJECT TYPE ID | GAME OBJECT TYPE | MOVEMENT AVAILABILITY INFO | MARKER ADDITION TARGET CHARACTERISTICS INFO | POSITION |
| b001 | j005 | BUILDING | NOT AVAILABLE | 3 | (221,351,112) |
| b002 | j001 | WEAPON | NOT AVAILABLE | 3 | (265,493,136) |
| b003 | j007 | CAR | AVAILABLE | 4 | (469,123,040) |
| b004 | j001 | WEAPON | NOT AVAILABLE | 3 | (573,938,246) |
| b005 | j002 | TREASURE | NOT AVAILABLE | 3 | (295,759,556) |
| ... | ... | ... | ... | ... | ... |

FIG. 6

TBL6

| MARKER ID | MARKER INFORMATION ||||||||
|---|---|---|---|---|---|---|---|---|
| | MARKER IMAGE DISPLAY INFO ||||| MESSAGE IMAGE DISPLAY INFO || USER IMAGE DISPLAY INFO || MARKER ADDITION TIME |
| | MARKER ADDITION TARGET CHARAC- TERISTICS INFO | POSITION | GAME CHARACTER ID | GAME OBJECT ID | CANDIDATE MESSAGE ID | INPUT TEXT INFO | MARKER ADDING USER INFO (USER ID) | MARKER ADDING USER IMAGE INFO | |
| m001 | 5 | (122,301,118) | Null | Null | k011 | Null | u001 | 😀 | 0:12:36 |
| m002 | 2 | (195,259,056) | c005 | Null | k004 | Null | u015 | 😀 | 0:21:59 |
| m003 | 1 | (358,332,060) | c011 | Null | Null | Stay there ! | u005 | 😀 | 0:45:13 |
| m004 | 3 | (221,351,112) | Null | b001 | k008 | Null | u002 | 😀 | 1:01:54 |
| m005 | 4 | (469,123,040) | Null | b003 | Null | I take a break | u003 | 😀 | 1:25:31 |
| ... | ... | ... | ... | ... | ... | ... | ... | ... | ... |

| CANDIDATE MESSAGE ID | CANDIDATE MESSAGE INFORMATION ||
| --- | --- | --- |
| | MARKER ADDITION TARGET CHARACTERISTICS INFO | MESSAGE TEXT INFO |
| k001 | 1 | Let's save our friend ! |
| k002 | 1 | Let's leave it up to our friend ! |
| k003 | 2 | Let's attack this enemy ! |
| k004 | 2 | This enemy is strong ! |
| k005 | 3 | Let's defend against an attack here ! |
| ⋮ | ⋮ | ⋮ |

GAME DEVICE, RECORDING MEDIUM, AND GAME SYSTEM

CROSS REFERENCE TO RELATED APPLICATIONS

This Application is a Continuation Application of PCT Application No. PCT/JP2018/034015, filed Sep. 13, 2018, which is based on and claims priority from Japanese Patent Application No. 2017-177170, filed Sep. 14, 2017, the entire contents of which are incorporated herein by reference.

BACKGROUND

Field of the Invention

The present invention relates to a game device, a recording medium, and a game system.

Description of Related Art

Known in the art is a technique that allows users to communicate with each other by a message exchange means, such as chat or the like, in a game where each user operates a player character in a virtual space (for example, see Japanese Patent Application Laid-Open Publication No. 2016-016146).

In a game where each user operates a player character in a virtual space, it sometimes becomes necessary to transmit information on a position in the virtual space from one user to another user. Examples of the information include the position of an enemy character present in the virtual space, the position of a site to be defended by the player character in the virtual space, and other similar positions. However, it is difficult to represent the position correctly by using a text (message). Accordingly, through a conventional message exchange means, such as chat or the like, the position indicated by information transmitted from one user to another user is sometimes incorrect; namely, it is a different position from the position the one user intended to indicate.

SUMMARY

The present invention has been made in view of the problem described above, and has as its object provision of a technique that can correctly transmit a position in a virtual space in a game where each user operates a player character in a game space, in comparison with the conventional technique.

To achieve the stated object, a recording medium according to an aspect of the present invention is a non-transitory computer readable recording medium having recorded thereon a program for a game device having a processor, the program causing the processor to: identify a game element in a virtual space, or a position of the game element in the virtual space, based on an indicated direction in the virtual space in accordance with an operation input made by a user; and generate first information to enable a position designation image to be displayed on a display unit, the position designation image being representative of the position in the virtual space depending on an identification result obtained by identifying the game element or the position of the game element.

A game device according to an aspect of the present invention includes: a processor and a memory that is operatively coupled to the processor and is configured to store instructions executed by the processor, in which upon execution of the instructions the processor is configured to: identify a game element in a virtual space or a position of the game element in the virtual space, based on an indicated direction in the virtual space in accordance with an operation input made by a user; and generate first information to enable a position designation image to be displayed on the display unit, the position designation image being representative of a position in the virtual space depending on an identification result obtained by identifying the game element or the position of the game element.

A game system according to an aspect of the present invention is a game system including a first game device, and a second game device configured to communicate with the first game device, in which the first game device includes: a processor; and a memory that is operatively coupled to the processor and is configured to store instructions executed by the processor, in which upon execution of the instructions the processor is configured to: identify a game element in a virtual space or a position of the game element in the virtual space, based on an indicated direction in the virtual space in accordance with an operation input made by a user; and generate first information to enable a position designation image to be displayed on a display unit, the position designation image being representative of a position in the virtual space depending on an identification result obtained by identifying the game element or the position of the game element, and in which the second game device is configured to display the position designation image on the display unit, based on the first information.

BRIEF DESCRIPTION OF THE DRAWINGS

FIG. 4 shows an example of the data structure of a game character management table TBL2.

FIG. 5 shows an example of the data structure of a game object management table TBL3.

FIG. 6 shows an example of the data structure of a marker information management table TBL6.

DESCRIPTION OF THE EMBODIMENTS

Figure 1:
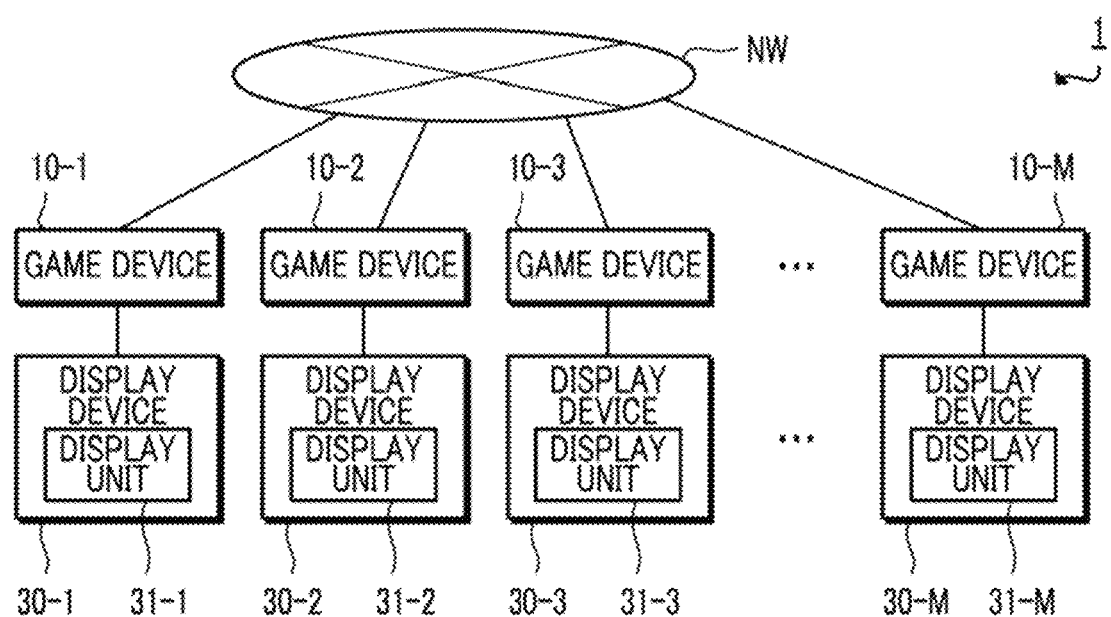
FIG. 1 is an explanatory diagram showing an example of an overview of a game system 1 according to an embodiment of the present invention.

Embodiments for implementing the present invention are described below with reference to the drawings. In the drawings, the dimensions and scales of the components are appropriately different from actual ones. Since the embodiments described below are specific preferred examples of the present invention, technically preferable various limitations are applied to the embodiments. However, the scope of the present invention is not limited to these embodiments, unless the following description specifies such a limitation.

A. EMBODIMENT

An embodiment of the present invention will be described hereafter.

1. OVERVIEW OF GAME SYSTEM

FIG. 1 is an explanatory diagram showing an overview of a game system 1 according to this embodiment. Hereafter, referring to FIG. 1, an overview of the game system 1 is described.

As exemplified in FIG. 1, the game system 1 includes multiple game devices 10-1 to 10-M that can execute a battle game (an example of a "game"), and multiple display devices 30-1 to 30-M respectively corresponding to the game devices 10-1 to 10-M (M is a natural number equal to or greater than one). In the following description, among the game devices 10-1 to 10-M, the m-th game device 10 is sometimes referred to as a game device 10-$m$ (m is a natural number satisfying 1≤m≤M). Similarly, among the display devices 30-1 to 30-M, the m-th display device 30 is sometimes referred to as a display device 30-$m$.

In this embodiment, a case where the game device 10 is a home use game device is assumed as an example. However, any information processing device may be adopted as the game device 10. For example, the game device 10 may be an arcade game device installed in a shop, a play facility or other similar places. The game device 10 may be a mobile device, such as a mobile phone, a smartphone or other similar devices. Alternatively, the game device 10 may be a terminal type information device, such as a personal computer or other similar devices.

The game device 10-$m$ can communicate with the display device 30-$m$ corresponding to the game device 10-$m$. The game device 10-$m$ can then display an image for a battle game executed in the game device 10-$m$, on the display unit 31-$m$ included in the display device 30-$m$ corresponding to the game device 10-$m$.

Any one of the game devices 10-1 to 10-M, for example, the game device 10-1, can communicate with another game device 10, such as the game device 10-2, via a network NW. Specifically, the game device 10-1 transmits, to the game device 10-2, information on the battle game executed in the game device 10-1, and the game device 10-2 transmits, to the game device 10-1, information on the battle game executed in the game device 10-2. Accordingly, the information on the battle game executed in each game device 10-$m$ can be shared among the game devices 10-1 to 10-M. Consequently, a user U1 of the game device 10-1 and a user U2 of the game device 10-2 can cooperate with each other in the battle game and complete a mission, or battle against each other in the battle game. In this embodiment it is assumed a case where the user U of the game device 10-1 and the user U2 of the game device 10-2 cooperate with each other in the battle game and aim to complete a mission.

This embodiment exemplifies a case where the game devices 10 communicate with each other via the network NW and execute the battle game. However, the present invention is not limited to such an aspect. Alternatively, each game device 10 may execute the battle game solely without communication with another game device 10. In this case, the user U of each game device 10 may be allowed to play the battle game solely.

Assumed in this embodiment, for example, is a case where the game devices 10 are operated by the respective single users U. However, the present invention is not limited to such an aspect. Alternatively, the users U may operate a single game device 10, thereby allowing the users U operating the single game device 10 to cooperate with (or battle against) each other and to play the battle game.

In this embodiment, the battle game executed in the game device 10 means, for example, a game where the user U of the game device 10 operates the game device 10 to cause a player character serving as an operation target of the user U of the game device 10 to perform an action in a virtual field Fd (an example of the "virtual space") in the battle game thereby to aim to complete a predetermined mission that has been preliminarily set in the battle game.

Assumed in this embodiment, for example, is a case where a player character operated by the user U1 of the game device 10-1 and a player character operated by the user U2 of the game device 10-2 cooperate with each other and aim to complete the predetermined mission. Hereafter, for convenience of description, the player character operated by the user U1 is sometimes referred to as a player character CP, and the player character operated by the user U2 is sometimes referred to as a friend character CF.

It is of note that assumed in this embodiment, for example, is a case where the field Fd is a three-dimensional space. The field Fd may be a two-dimensional space.

Assumed in this embodiment, for example, is a case where the predetermined mission is a task of defending a base provided in the field Fd against an enemy character CE present in the field Fd. It is of note that examples of the predetermined mission include defeating the enemy character CE present in the field Fd, obtaining a predetermined item in the field Fd, rescuing a predetermined friendly character present in the field Fd, the play time period of the battle game by the user U of the game device 10 reaching a predetermined time period, points obtained by the user U of the game device 10 in the battle game reaching a predetermined value, or the like.

In the following description, the player characters including the player character CP and the friend character CF, and the enemy character CE are collectively referred to as game characters CG in some cases.

In the battle game according to this embodiment, each user U can irradiate a game element present in the field Fd or a part of a game element present in the field Fd with the laser beam Ls, and add a marker MK corresponding to the target irradiated with the laser beam Ls. Hereafter, the game element serving as a target to which the marker MK is added, and the position of the part of the game element serving as the target to which the marker MK is added are collectively referred to as "marker addition targets."

When one user U adds the marker MK to a marker addition target, a marker image GMK representative of the marker MK is displayed on the display unit 31 corresponding to the game device 10 operated by another user U. Accordingly, when the one user U adds the marker MK to the marker addition target, the other user U can confirm the marker addition target on the display unit 31. That is, the other user U can see that the one user U has added the marker MK to the marker addition target, and note the position of the marker addition target to which the marker MK has been added in the field Fd. It is of note that the marker image GMK is an example of "position designation image" representative of the position of the marker addition target in the field Fd.

In this embodiment, the game elements have a concept including game characters CG present in the field Fd, game objects Ob present in the field Fd, and an environment Ev constituting the field Fd. Here, the game object Ob is a virtual object present in the field Fd. Examples of the game objects Ob include: buildings such as bases homes, and the like, that are present in the field Fd; items, such as weapons protective gear and the like that are present in the field Fd; and vehicles, such as automobiles airplanes and the like, that are movable in the field Fd.

The environment Ev is an aggregate of components (hereafter referred to as "environment components") that constitute the field Fd. Examples of the environment components, which constitute the field Fd, include the ground, mountains, grass, trees, rocks, clouds and the like that are present in the field Fd.

In the battle game according to this embodiment, when each user U adds a marker MK to a marker addition target, the user can input a message MS (an example of "designation message") related to the marker MK. When one user U inputs the message MS, a message image GMS representative of this message MS is displayed on the display unit 31 corresponding to the game device 10 operated by another user U.

2. GAME DEVICE CONFIGURATION

Hereafter, referring to FIGS. 2 to 8, an overview of the game device 10 will be described.

Figure 2:
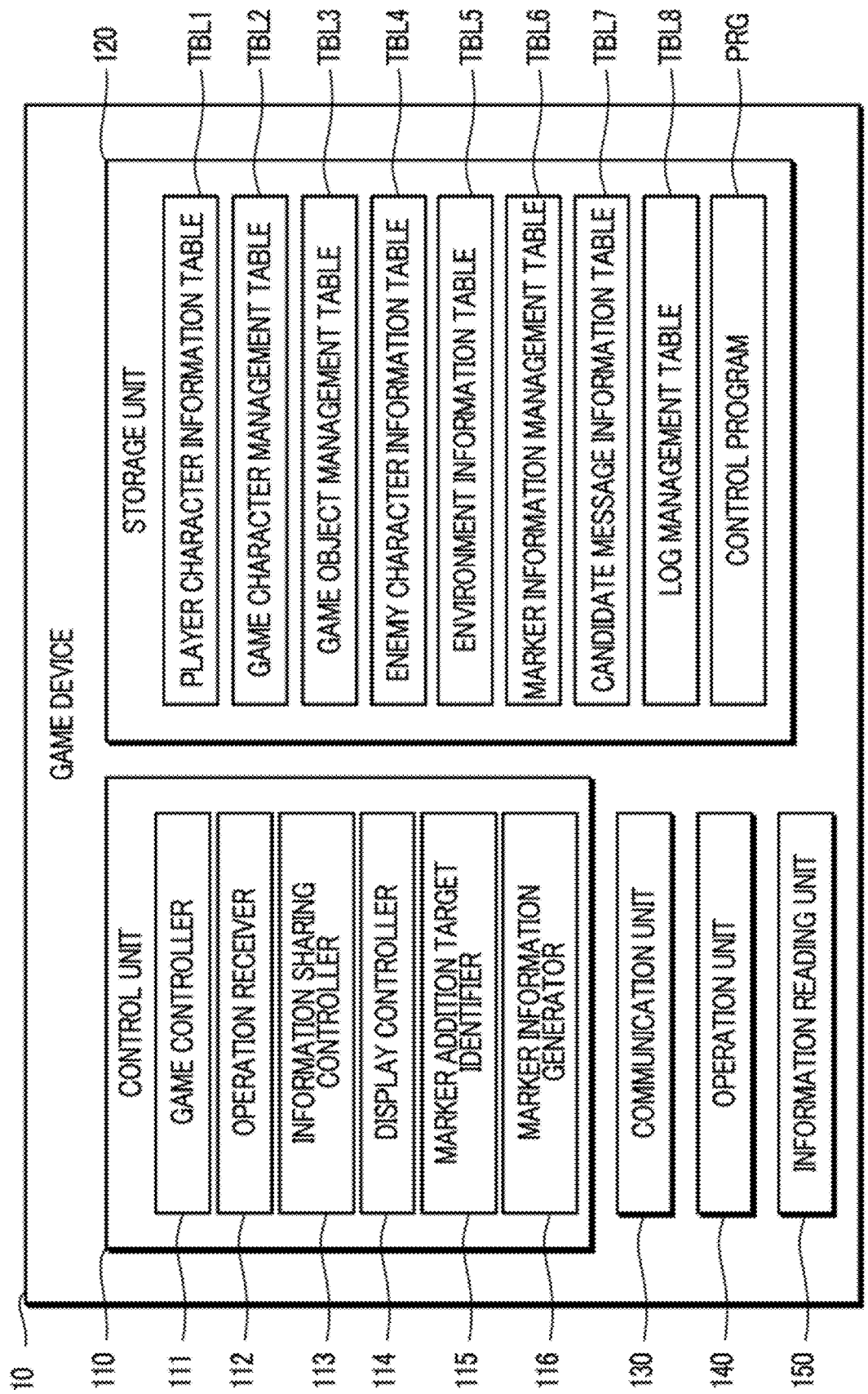
FIG. 2 is a block diagram showing an example of the configuration of a game device 10.

FIG. 2 is a block diagram showing an example of the configuration of the game device 10. As shown in FIG. 2, the game device 10 includes a control unit 110 that controls each component of the game device 10, a storage unit 120 that stores various pieces of information, a communication unit 130 for executing communication between the display device 30 and an external device, such as another game device 10 and other similar devices, an operation unit 140 for receiving an operation input performed by the user U of the game device 10, and an information reading unit 150 for reading information from a recording medium, such as an optical disk and the like.

The control unit 110 includes a game controller 111, an operation receiver 112 (an example of "input receiver"), an information sharing controller 113, a display controller 114, a marker addition target identifier 115 (an example of "identifier"), and a marker information generator 116 (an example of "generator").

Among these components, the game controller 111 controls the progress of the battle game executed in the game device 10. For example, the game controller 111 causes the game characters CG including the player character and the enemy character CE to perform actions in the field Fd for the battle game.

When the user U of the game device 10 operates the operation unit 140, the operation receiver 112 receives the input operation details. In this embodiment, the user U can designate a direction VL (an example of "indicated direction") in which the laser beam Ls travels in the field Fd by operating the operation unit 140.

When the game device 10 operated by the user U and another game device 10 operated by another user U communicate with each other and execute the battle game in cooperation, the information sharing controller 113 obtains information on the battle game from the other game device 10 via the communication unit 130, and supplies the other game device 10 with information on the battle game via the communication unit 130. Hereafter, information shared by one game device 10 and another game device 10 that execute the battle game is sometimes referred to as "shared information."

The display controller 114 displays an image for the battle game on the display unit 31 provided in the display device 30 corresponding to the game device 10.

The marker addition target identifier 115 identifies the marker addition target on the basis of the direction VL of the laser beam Ls in the field Fd, the direction having been designated in accordance with the operation input through the operation unit 140 by the user U.

The marker information generator 116 generates information (hereafter referred to as "marker information") for the marker MK to be added to the marker addition target identified by the marker addition target identifier 115.

The storage unit 120 stores a player character information table TBL1, a game character management table TBL2, a game object management table TBL3, an enemy character information table TBL4, an environment information table TBL5, a marker information management table TBL6, a candidate message information table TBL7, a log management table TBL8, and a control program PRG for the game device 10.

Figure 3:
FIG. 3 shows an example of the data structure of a player character information table TBL1.

FIG. 3 shows an example of the data structure of the player character information table TBL. As shown in FIG. 3, the player character information table TBL1 stores player character information that includes, for example, a user ID of the user U1 operating the player character CP, a game character ID of the player character CP, a skill level indicating the degree of magnitude of skill of the player character CP, a maximum hit point that is the maximum value of the vitality of the player character CP (sometimes referred to as "hit points"), the attack power and the defense power of the player character CP, and user image information that is representative of a user image Gua representative of the user U1 operating the player character CP.

Here, the user ID is information for identifying each user U among all the users U participating in the battle game. The game character ID is information for identifying each game character CG from among all the game characters CG that may appear in the battle game.

FIG. 4 shows an example of the data structure of the game character management table TBL2. As exemplified in FIG. 4, the game character management table TBL2 includes one or more records corresponding one-to-one to all the game characters CG that may appear in the battle game. Each record of the game character management table TBL2 stores the game character ID of a game character CG, and the game character management information on the game character CG. Here, the game character management information includes, for example, the user ID of the user U operating each game character CG; a team ID representative of a team to which each game character CG belongs; a character type ID of each game character CG; marker addition target characteristics information indicating the characteristics of each game character CG as a marker addition target; the position of each game character CG in the field Fd; a direction in which each game character CG faces in the field Fd (hereafter, sometimes simply referred to as "direction"); the remaining hit points that represent the power remaining in each game character CG; and action information indicating the details of an action of each game character CG.

In the game character management information, the team ID is information for identifying the team to which each game character CG belongs, in a case where game characters CG appearing in the battle game are classified into teams and battle each other.

The character type ID is information for identifying the type of each game character CG from among all the types of game characters CG that may appear in the battle game.

The marker addition target characteristics information indicates the characteristics of the game element (or a part thereof) as the marker addition target. Hereafter, for example, cases are assumed as follows. The marker addition target characteristics information corresponding to the marker addition target indicates "1," if the friend character CF having the same team ID as the player character CP is the marker addition target. The marker addition target characteristics information corresponding to the marker addition target indicates "2," if the enemy character CE having a team ID different from that of the player character CP is the marker addition target. The marker addition target characteristics information corresponding to the marker addition target indicates "3," if the game object Ob fixed in the field Fd is the marker addition target. The marker addition target characteristics information corresponding to the marker addition target indicates "4," if the game object Ob movable in the field Fd is the marker addition target. The marker addition target characteristics information corresponding to the marker addition target indicates "5," if the position of a part of the environment Ev constituting the field Fd is the marker addition target.

If the game character CG is a non-player character that is not to be operated by the user U, the user ID is set to "Null value."

FIG. 5 shows an example of the data structure of the game object management table TBL3. As exemplified in FIG. 5, the game object management table TBL3 includes one or more records corresponding one-to-one to all the game objects Ob that may appear in the battle game. Each record of the game object management table TBL3 stores a game object ID of a game object Ob, and game object management information on the game object Ob.

Here, the game object ID is information for identifying each game object Ob from among all the game objects Ob that may appear in the battle game. The game object management information is, for example, information that includes the game object type ID of each game object Ob, the name of each game object Ob, movement availability information indicating whether each game object Ob is allowed to move in the field Fd, the marker addition target characteristics information on each game object Ob, and the position of each game object Ob in the field Fd. The game object type ID is information for identifying the type of each game object Ob from among all the types of game objects Ob that may appear in the battle game.

The enemy character information table TBL4 stores enemy character information on the enemy character CE that may appear in the battle game. Here, the enemy character information includes, for example, the maximum hit point, the attack power and the defense power of the enemy character CE, and other similar parameters of the enemy character CE.

The environment information table TBL5 stores environment information that includes the three-dimensional shape of the environment Ev constituting the field Fd for the battle game, and the coloration of the environment Ev. In this embodiment, the environment components, such as mountains, trees rocks and the like, which constitute the environment Ev, are one aspect of the shape and coloration of each part of the environment Ev. However, the present invention is not limited to such an aspect. Alternatively, the environment components may be the game objects Ob.

FIG. 6 shows an example of the data structure of the marker information management table TBL6. As exemplified in FIG. 6, the marker information management table TBL6 includes one or more records corresponding one-to-one to all the markers MK added by the user U in the battle game. Each record of the marker information management table TBL6 stores the marker ID of each marker MK, and marker information on the marker MK.

Here, the marker ID is information for identifying each marker MK from among all the markers MK added by any user U in the battle game. The marker information includes, for example, marker image display information (an example of "first information") for displaying the marker image GMK indicating the marker MK added by a user U on the display unit 31 corresponding to the game device 10 operated by another user U; message image display information (an example of "second information") for displaying the message image GMS indicating the message MS input by the user U in relation to the marker MK on the display unit 31 corresponding to the game device 10 operated by another user U; user image display information (an example of "third information") for displaying the user image Gua representative of the user U that has added the marker MK on the display unit 31 corresponding to the game device 10 operated by another user U; and a time when the user U adds the marker MK (marker addition time).

In the marker information, the marker image display information includes the marker addition target characteristics information corresponding to the marker addition target to which the marker MK is added, and the position of the marker addition target in the field Fd. The marker image display information includes the game character ID corresponding to the game character CG if the marker addition target is the game character CG, and includes the game object ID corresponding to the game object Ob if the marker addition target is the game object Ob.

In this embodiment, when the user U adds the marker MK to the marker addition target, the user U can select one candidate message MC from among the predetermined candidate messages MC, and input the one selected candidate message MC as the message MS. In this embodiment, when the user U adds the marker MK to the marker addition target, the user U can input any character string as the message MS by operating the operation unit 140.

In the marker information, the message image display information includes a candidate message ID corresponding to the selected candidate message MC if the user U inputs the selected candidate message MC as the message MS when adding the marker MK to the marker addition target. Here, the candidate message ID is information for identifying each candidate message MC from among all the candidate messages MC present in the battle game.

If the user U inputs any character string as the message MS by operating the operation unit 140 when adding the marker MK to the marker addition target, the message image display information includes input text information representative of the character string input performed by the user U.

In the marker information, the user image display information includes a marker adding user information indicating the user ID corresponding to the user U who added the marker MK, and a marker adding user image information representative of the user image Gua of the user U.

Figures 7, 8:
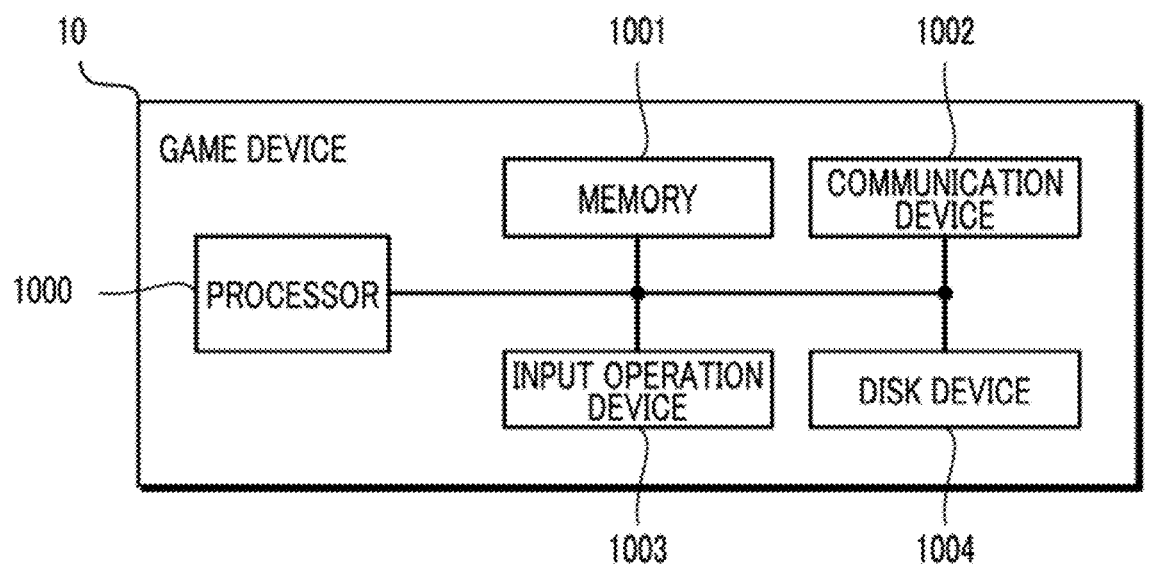
FIG. 7 shows an example of the data structure of a candidate message information table TBL7.
FIG. 8 shows an example of a hardware configuration of the game device 10.

FIG. 7 shows an example of the data structure of the candidate message information table TBL7. As exemplified in FIG. 7, the candidate message information table TBL7 includes one or more records corresponding one-to-one to all the candidate messages MC present in the battle game. Each record of the candidate message information table TBL7 stores the candidate message ID of a candidate message MC, and candidate message information on the candidate message MC.

In the candidate message information table, the candidate message information includes the marker addition target characteristics information corresponding to the marker addition target, and message text information indicating the text of the candidate message MC, if the candidate message MC is input as the message MS when the user U adds the marker MK to the marker addition target.

The log management table TBL8 stores log information indicating a history related to events having occurred in the field Fd during the battle game in execution.

Here, an event is a concept that includes, for example, change in the state of the game character CG, change in the action details of the game character CG, addition of the marker MK to the marker addition target, or the like. Among the events, the state of the game character CG may be a concept that includes, for example, a state relating to the possibility of survival of the game character CG, a state relating to capabilities, such as the attack power, the defense power and the like of the game character CG, a state relating to items held by the game character CG, and other similar states.

The control program PRG is a program for controlling the game device 10. In this embodiment, the control program PRG includes, for example, an operation system program for controlling each component of the game device 10, and an application program (game program) for allowing the game device 10 to execute the battle game. Among these programs, the application program may be read from the information reading unit 150 and stored in the storage unit 120 when the user U of the game device 10 starts the battle game.

FIG. 8 shows an example of the hardware configuration of the game device 10.

As shown in FIG. 8, the game device 10 includes a processor 1000 that controls each component of the game device 10, a memory 1001 that stores various pieces of information, a communication device 1002 for communication with a external device that exists outside of the game device 10, an input operation device 1003 for receiving an operation input made by the user U of the game device 10, and a disk device 1004 for reading information from a recording medium.

The memory 1001 is a non-transitory computer readable recording medium, and includes, for example, a volatile memory, such as RAM (Random Access Memory), serving as a working area for the processor 1000, and a non-volatile memory, such as an EEPROM (Electrically Erasable Programmable Read-Only Memory), storing various pieces of information, such as the control program PRG of the game device 10, and provides a function as the storage unit 120.

The processor 1000 is, for example, a CPU (Central Processing Unit), and executes the control program PRG stored in the memory 1001 and operates according to the control program PRG, thereby functioning as the control unit 110.

The communication device 1002 is hardware for communication with an external device that exists outside of the game device 10 via one or both of a wired network and a wireless network, and functions as the communication unit 130.

The input operation device 1003 is, for example, operation buttons, and functions as the operation unit 140 that receives an operation input performed by the user U of the game device 10. The input operation device 1003 may include one or more devices that include, for example, some or all of operation buttons, a touch panel, a keyboard, and pointing devices, such as a joystick and a mouse.

The disk device 1004 is, for example, an optical disk device, and functions as the information reading unit 150 that reads various pieces of information, such as the control program PRG, recorded in a recording medium, such as an optical disk.

The processor 1000 may have a configuration including hardware, such as a GPU (Graphics Processing Unit), a DSP (Digital Signal Processor) or an FPGA (Field Programmable Gate Array), in addition to the CPU or to instead of the CPU. In this case, a part of or the entire control unit 110 achieved by the processor 1000 may be achieved by hardware, such as a DSP.

3. GAME OVERVIEW

Referring to FIGS. 9 to 12, an overview of the battle game executed in the game device 10 according to this embodiment will be described.

Figure 9:
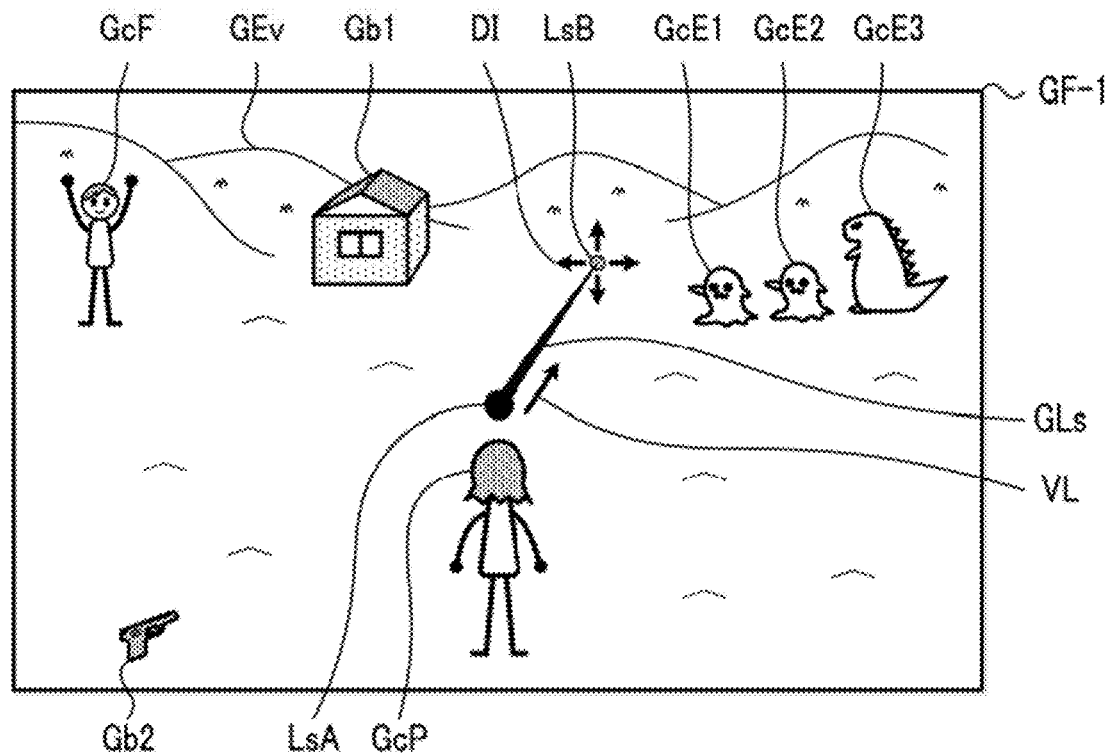
FIG. 9 illustrates an example of a field screen GF-1.

FIG. 9 is a diagram showing an example of the field screen GF that is representative of the field Fd of the battle game. The field screen GF is a screen representative of an imaging result of an image taken of the field Fd through a virtual camera CM. When the game device 10 executes the battle game, the display controller 114 of the game device 10 can display the field screen GF on the display unit 31 of the display device 30 corresponding to the game device 10. FIG. 9 shows an example of the field screen GF displayed on the display unit 31-1 of the display device 30-1 corresponding to the game device 10-1 when the user U1 of the game device 10-1 (an example of "first game device") and the user U2 of the game device 10-2 (an example of "second game device") cooperate and execute the battle game.

Hereafter, a field screen GF displayed on the display unit 31-1 of the display device 30-1 corresponding to the game device 10-1 is sometimes referred to as a field screen GF-1. A field screen GF displayed on the display unit 31-2 of the display device 30-2 corresponding to the game device 10-2 is sometimes referred to as a field screen GF-2. The field screen GF-1 is a screen representative of an imaging result of an image taken of the field Fd through a virtual camera CM-1 corresponding to the player character CP operated by the user U1. The field screen GF-2 is a screen representative of an imaging result of an image taken of the field Fd through a virtual camera CM-2 corresponding to the friend character CF operated by the user U2.

As shown in FIG. 9, the field screen GF-1 displayed on the display unit 31-1 includes, for example, an environment image GEv representative of the environment Ev constituting the field Fd of the battle game, a character image GcP representative of the player character CP operated by the user U1 of the game device 10-1, a character image GcF representative of the friend character CF operated by the user U2 of the game device 10-2, character images GcE (GcE1 to GcE3) representative of the enemy characters CE present in the field Fd, and game object images Gb (Gb1 and Gb2) representative of the game objects Ob present in the field Fd. When the user U1 operates the operation unit 140 to emit the laser beam Ls, a laser beam image GLs (an example of "image of the line") representative of the laser beam Ls is displayed on the field screen GF-1.

Figure 10:
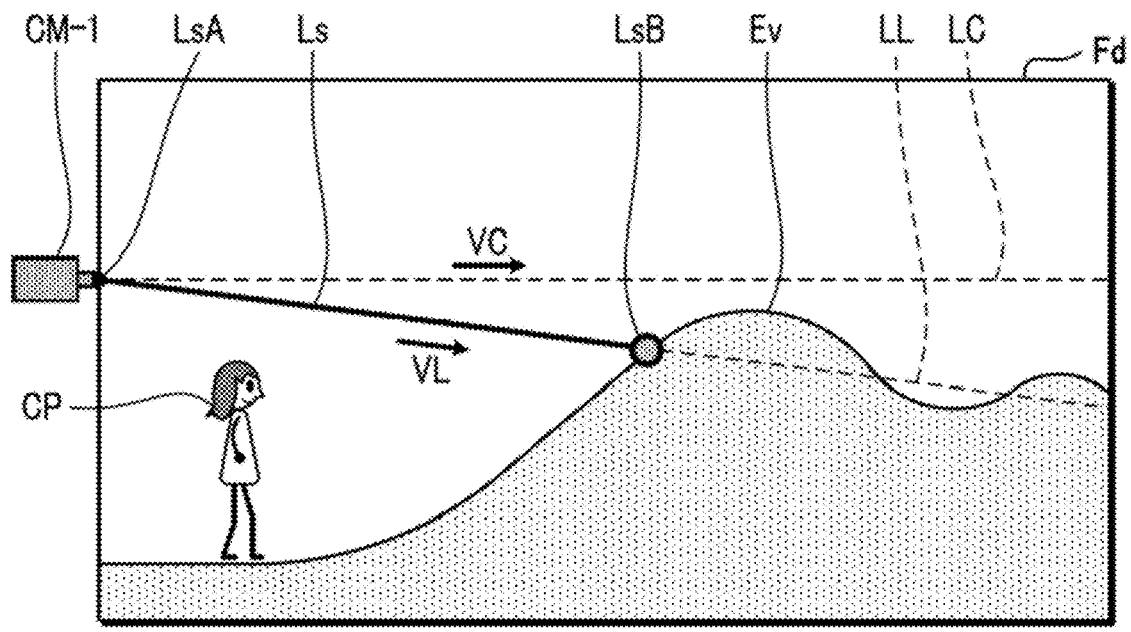
FIG. 10 illustrates an example of a laser beam Ls.

FIG. 10 is a diagram illustrating the laser beam Ls in the field Fd. As shown in FIG. 10, the laser beam Ls is a parallel beam that has a specific radius and travels on a line LL in the field Fd. Here, the line LL is a straight line that intersects the virtual camera CM-1 and extends in the direction VL in the field Fd. The start point LsA of the laser beam Ls is set at a position on which the virtual camera CM-1 resides in the field Fd. The end point LsB of the laser beam Ls is set at a position on which the line LL intersects with a game element for the first time as viewed from the virtual camera CM-1.

As shown in FIGS. 9 and 10, when the laser beam image GLs is displayed on the field screen GF-1, the user U1 can designate the direction VL in which the laser beam Ls extends, by operating the operation unit 140.

In this embodiment, the initial value of the direction VL in which the laser beam Ls travels coincides with the direction VC of the virtual optical axis LC of the virtual camera CM-1 (hereafter, sometimes referred to as "imaging direction VC"). After the laser beam image GLs is displayed on the field screen GF-1, the user U1 can operate the operation unit 140 to adjust the position of the end point LsB of the laser beam Ls by adjusting the direction VL. Accordingly, the user U1 can freely adjust the position of the end point LsB of the laser beam Ls in the vertical and lateral directions as viewed from the virtual camera CM-1 in the field screen GF-1, as indicated by arrows DI in FIG. 9, for example.

When the user U1 adjusts the direction VL of the laser beam Ls and adjusts the position of the end point LsB of the laser beam Ls, the display controller 114 may display the distance between the player character CP and the end point LsB in the field Fd, on the field screen GF-1.

The marker addition target identifier 115 identifies the marker addition target on the basis of the direction VL of the laser beam Ls designated by the user U1. That is, the marker addition target identifier 115 identifies, as the marker addition target, the game element present at the end point LsB of the laser beam Ls adjusted by the user U1, or the position of a part of the game element present at the end point LsB. Specifically, the marker addition target identifier 115 identifies, as the marker addition target, the game character CG or the game object Ob present at the end point LsB of the laser beam Ls, or the position of an environment component present at the end point LsB of the laser beam Ls in the environment Ev. Accordingly, the user U1 can add the marker MK to the marker addition target identified by the marker addition target identifier 115.

In this embodiment, the user U1 can adjust the direction VL of the laser beam Ls to a direction different from the imaging direction VC of the virtual camera CM-1. However, the present invention is not limited to such an aspect. For example, the user U1 may adjust the position of the end point LsB of the laser beam Ls by changing the imaging direction VC of the virtual camera CM-1 while making the direction VL of the laser beam Ls coincide with the imaging direction VC.

Figure 11:
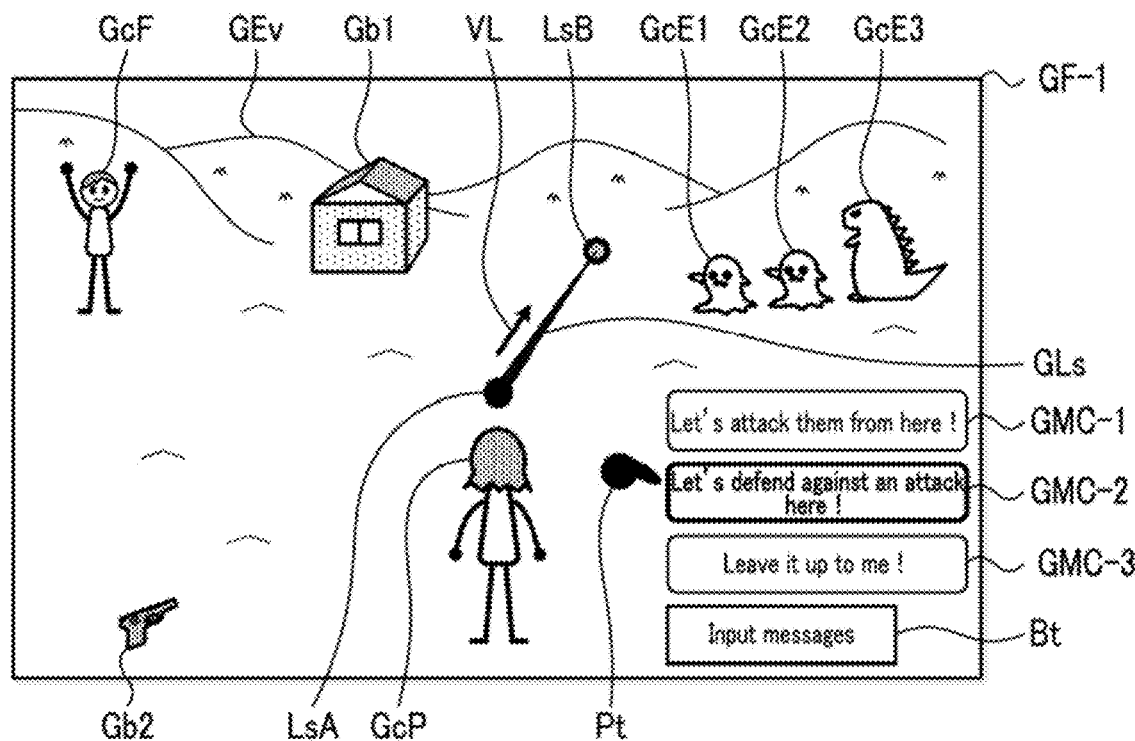
FIG. 11 illustrates an example of the field screen GF-1.

FIG. 11 shows an example of the field screen GF-1 in a case where the marker addition target identifier 115 identifies the marker addition target. As shown in FIG. 11, when the marker addition target identifier 115 identifies the marker addition target, the display controller 114 displays the candidate message images GMC (GMC-1 to GMC-3), each of which represents a candidate message MC corresponding to a marker addition target on the field screen GF-1. Here, the candidate message MC corresponding to the marker addition target is a candidate message MC where the marker addition target characteristics information included in the candidate message information has a value corresponding to the marker addition target. For example, when a marker addition target is the enemy character CE, the display controller 114 displays, on the field screen GF-1, the candidate message MC where the marker addition target characteristics information included in the candidate message information indicates "2" from among all the candidate messages MC stored in the candidate message information table TBL7 (see FIG. 7).

When the marker addition target identifier 115 identifies the marker addition target, the display controller 114 displays a message input button Bt on the field screen GF-1. The user U1 can select any one of the candidate message images GMC1 to GMC3 or the message input button Bt, by operating the operation unit 140 to move a pointer Pt displayed on the field screen GF-1.

When the user U1 selects one candidate message image GMC using the pointer Pt, the operation receiver 112 receives, as the message MS, the candidate message MC represented by the candidate message image GMC. When the user U1 selects the message input button Bt using the pointer Pt, the user U1 can input a character string by operating the operation unit 140. Then, the operation receiver 112 receives the input character string as the message MS.

Figure 12:
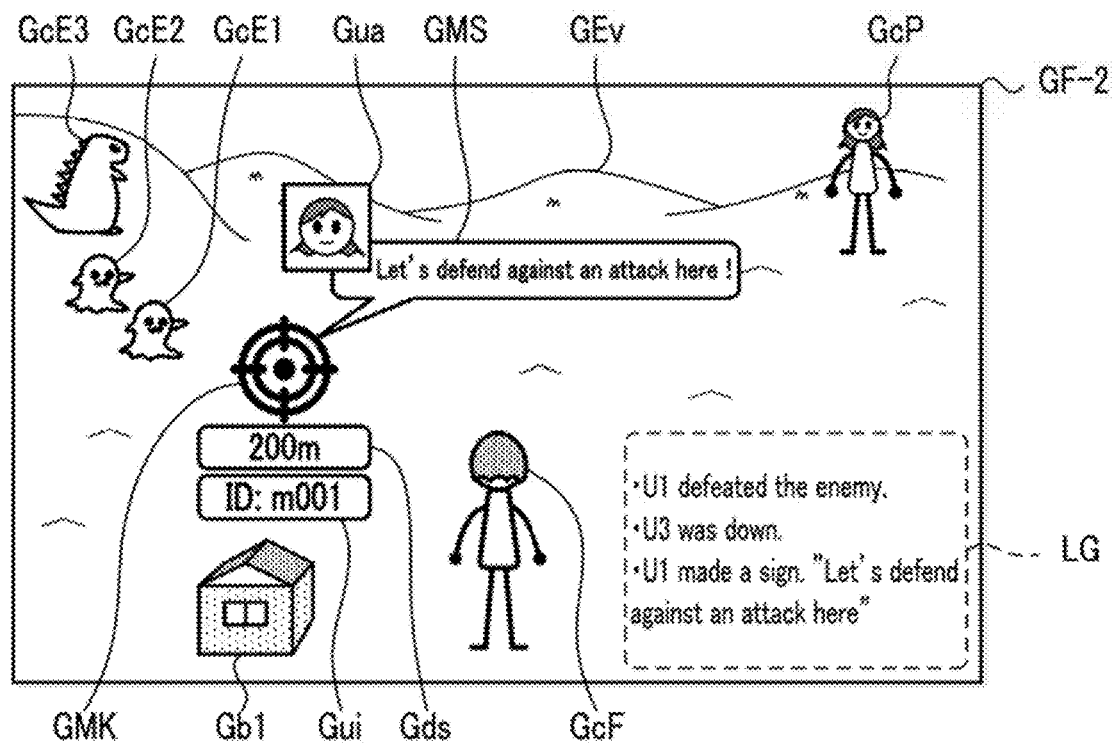
FIG. 12 illustrates an example of a field screen GF-2.

FIG. 12 shows an example of the field screen GF-2 in a case where the marker addition target identifier 115 of the game device 10-1 identifies the marker addition target, and the operation receiver 112 of the game device 10-1 receives an input of the message MS.

As shown in FIG. 12, when the marker addition target is identified and the message MS is input in the game device 10-1, the display controller 114 of the game device 10-2 displays, on the field screen GF-2, the marker image GMK representative of the marker MK added by the user U1 to the marker addition target, and the message image GMS representative of the message MS input by the user U1.

In this embodiment, the display controller 114 of the game device 10-2 displays the marker image GMK at a position identical to that of the marker addition target in the field Fd. However, the present invention is not limited to such an aspect. The display controller 114 of the game device 10-2 may display the marker image GMK at a position where the user U2 can recognize the position of the marker addition target. For example, the display controller 114 of the game device 10-2 may display the marker image GMK at a position where the distance from the marker addition target is equal to or less than the predetermined distance. In short, the display controller 114 of the game device 10-2 may display the marker image GMK at a position corresponding to the marker addition target.

In this embodiment, when the marker addition target moves in the field Fd, the display controller 114 of the game device 10-2 changes the display position of the marker image GMK in accordance with the movement of the marker addition target. More specifically, when the marker addition target moves in the field Fd, the display controller 114 of the game device 10-2 displays the marker image GMK at a position corresponding to the moving marker addition target.

In this embodiment, the display controller 114 of the game device 10-2 displays the marker image GMK having a shape shown in FIG. 12 on the field screen GF-2. However, this is only an example. The marker image GMK may have any shape. For example, the display controller 114 of the game device 10-2 may display the marker image GMK having a shape corresponding to the marker addition target, on the field screen GF-2. For example, the display controller 114 of the game device 10-2 may display the marker image GMK having a shape corresponding to the marker addition target characteristics information on the marker addition target, on the field screen GF-2. If the marker addition target is the game character CG, the display controller 114 of the game device 10-2 may display the character image GcF or the character image GcE, which represents the game character CG, in a highlighted manner, through illumination or blinking. In this case, according to this embodiment, the character image displayed in the highlighted manner is the marker image GMK.

When the display controller 114 of the game device 10-2 displays the marker image GMK on the field screen GF-2, the game device 10-2 may output a notification sound through a loudspeaker (not shown) corresponding to the game device 10-2. In this case, the aspect of the notification sound output from the loudspeaker may be changed in accordance with the marker addition target to which the marker MK is added.

As shown in FIG. 12, when the marker addition target is identified and the message MS is input in the game device 10-1, the display controller 114 of the game device 10-2 displays, on the field screen GF-2, the user image Gua representative of the user U1 who added the marker MK to the marker addition target, and information for uniquely identifying the user U1, for example, a user identifying image Gui representative of the user ID. Hereafter, the user image Gua and the user identifying image Gui are sometimes referred to as "user identification images." It is of note that this embodiment exemplifies the case where the user identification image includes the user image Gua and the user identifying image Gui. However, the present invention is not limited to such an aspect. Alternatively, the user identification image is only required to include at least one of the user image Gua and the user identifying image Gui.

When the marker addition target is identified and the message MS is input in the game device 10-1, the game controller 111 of the game device 10-2 calculates the distance between the marker addition target and the friend character CF. In this case, the display controller 114 of the game device 10-2 displays, on the field screen GF-2, a distance image Gds indicating the distance calculated by the game controller 11.

The game controller 111 of the game device 10-1 generates log information (an example of "fourth information") indicating the history related to events having occurred in the field Fd in accordance with the execution of the battle game. In this case, the game controller 111 functions as "history manager" for generating the log information. The game controller 111 of the game device 10-1 adds, into the log information, identification of the marker MK by the user U1, that is, the history for addition of the marker addition target by the marker addition target identifier 115. As shown in FIG. 12, when the log information is generated in the game device 10-1, the display controller 114 of the game device 10-2 displays, on the field screen GF-2, a log image LG representative of the history related to the events indicated by the log information.

Hereafter, images displayed on the display unit 31-2 corresponding to the game device 10-2 accompanied by addition of the marker MK by the user U1 operating the game device 10-1 are sometimes collectively referred to as "marker-related images." The marker-related images include the marker image GMK, the message image GMS, the user image Gua, the user identifying image Gui, the distance image Gds, and the log image LG representative of the history for addition of the marker MK by the user U1.

In this embodiment, when the marker addition target to which the marker MK has been added by the user U1 disappears, the game controller 111 of the game device 10-1 may remove the marker information corresponding to the marker MK added to the disappearing marker addition target.

Here, examples of the removal of the marker information corresponding to the marker MK include removal of the record that stores the marker information corresponding to the marker MK from the marker information management table TBL6. In the marker information management table TBL6, in the record storing the marker information corresponding to the marker MK, a flag may be set indicating the disappearance of the marker addition target to which the marker MK has been added. Examples of a concept of the disappearance of the marker addition target include disappearance of the game character CG that is the marker addition target, disappearance of the game object Ob that is the marker addition target, and other similar disappearance. Among these examples, the disappearance of the game character CG may be, for example, the remaining hit points of the game character CG becomes "0," or the execution of the battle game by the user U who operates the game character CG is terminated. The disappearance of the game object Ob may be, for example, that the game object Ob is destroyed, or the game object Ob is consumed by the game character CG and disappears from the field Fd.

Furthermore, the game controller 111 of the game device 10-1 may remove the marker information corresponding to the marker MK, when a predetermined time period elapses from the time of addition of the marker MK by the user U1 (marker addition time).

In this embodiment it is assumed that only in a case where the marker information corresponding to the marker MK added by the user U1 operating the game device 10-1 is not removed, the marker-related image is displayed on the display unit 31-2 corresponding to the game device 10-2. In other words, in this embodiment, when the game controller 111 of the game device 10-1 removes the marker information, the marker-related image displayed on the display unit 31-2 corresponding to the game device 10-2 disappears accordingly.

It is of note that FIGS. 9 to 12 show the case where when the marker MK is added by the user U1 operating the game device 10-1, the marker-related image is displayed on the display unit 31-2 corresponding to the game device 10-2 operated by the user U2. However, this is only an exemplary case. In some cases, the marker-related image is displayed on the display unit 31-m corresponding to the game device 10-m, which is a device other than the game device 10-2.

Specifically, in this embodiment, only in a case where the player character operated by one user U and the player character operated by another user U have the same team ID, the marker-related image is displayed on the display unit 31 corresponding to the game device 10 operated by the other user U accompanied by the addition of the marker MK by the one user U. That is, in this embodiment, in a case where the player character operated by the one user U and the player character operated by the other user U have different team IDs, no marker-related image is displayed on the display unit 31 corresponding to the other game device 10 operated by the other user U even when the marker MK is added by the one user U operating the one game device 10.

4. GAME DEVICE OPERATION

Figure 13:
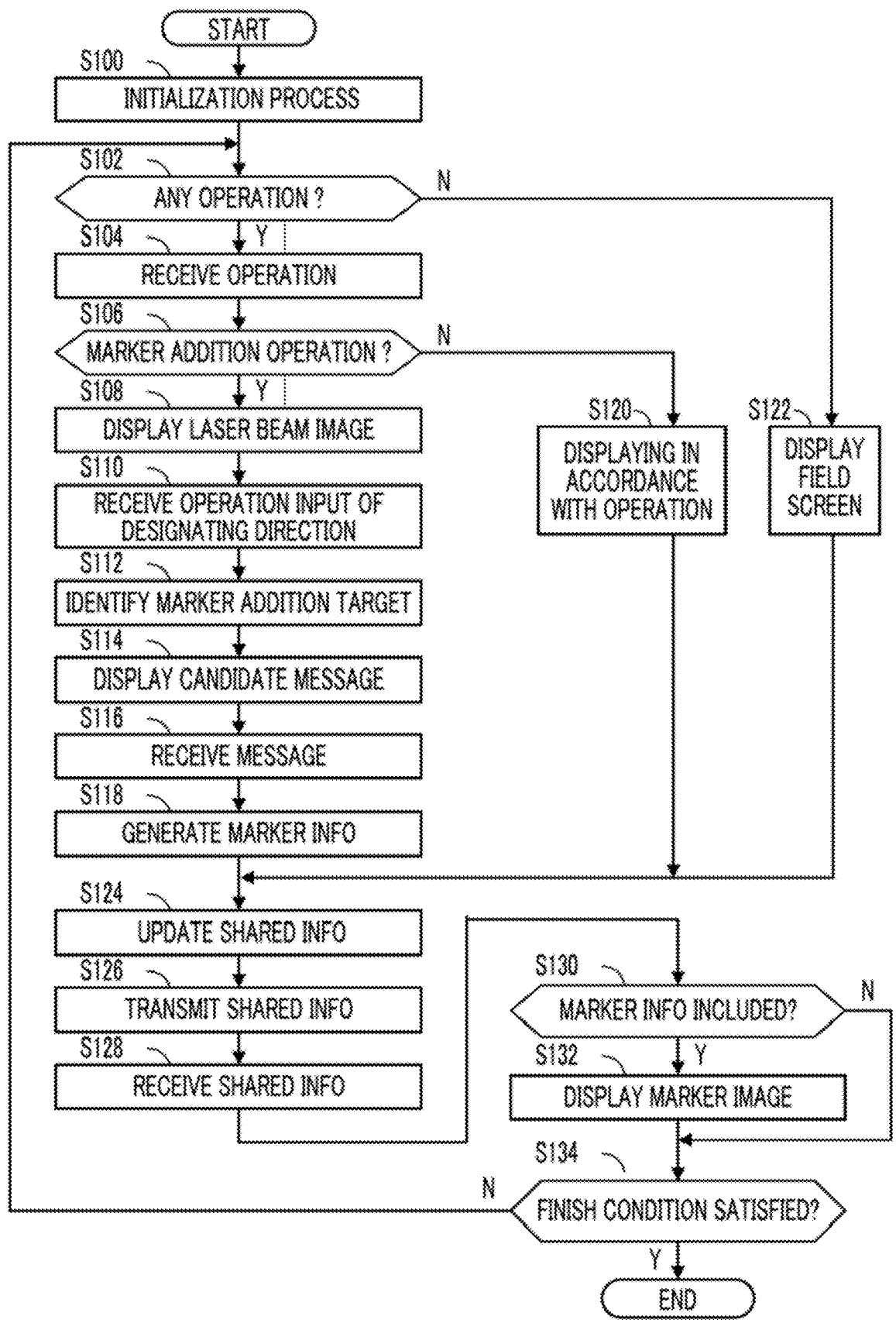
FIG. 13 is a flowchart showing an example of an operation of the game device 10.

Referring to FIG. 13, an example of the operation of the game device 10-1 in a case where the game device 10-1 executes the battle game is described.

FIG. 13 is a flowchart showing an example of the operation of the game device 10-1 operated by the user U1 in a case where the game device 10-1 executes the battle game.

As shown in FIG. 13, when the battle game is started in the game device 10-1, the game controller 111 first executes an initialization process (S100). Here, the initialization process is a process of setting various types of information stored in the player character information table TBL1, the game character management table TBL2 and the game object management table TBL3, to various values including predetermined values, values determined based on a predetermined rule, random values or other similar values.

Next, the game controller 111 determines whether the user U1 operates the operation unit 140 (S102).

If the determination result in step S102 is affirmative, the operation receiver 112 receives the operation input performed by the user U1 through the operation unit 140 (S104).

When the operation receiver 112 receives the operation performed by the user U1 in step S104, the game controller 111 determines whether the operation input is an operation of emitting the laser beam Ls to add the marker MK (S106).

If the determination result in step S106 is affirmative, the display controller 114 displays the laser beam image GLs representative of the laser beam Ls on the field screen GF-1 (S108).

If the display controller 114 displays the laser beam image GLs on the field screen GF-1 in step S108, the operation receiver 112 receives the operation input of designating the direction VL of the laser beam Ls represented by the laser beam image GLs by the user U1 (S110).

Next, the marker addition target identifier 115 identifies the marker addition target on the basis of the direction VL of the laser beam Ls designated by the user U1 (S112).

Specifically, in step S112, the marker addition target identifier 115 determines whether there exists the game character CG, which intersects with the line LL that passes through the virtual camera CM-1 and extends in the direction VL, on the basis of the game character management information stored in the game character management table TBL2.

If the determination result is affirmative, the game character ID of the game character CG intersecting with the line LL (hereafter, the game character CG is referred to as "intersecting character") is identified.

In step S112, the marker addition target identifier 115 determines whether the game object Ob intersecting with the line LL exists on the basis of the game object management information stored in the game object management table TBL3. If the determination result is affirmative, the marker addition target identifier 115 identifies the game object ID of the game object Ob intersecting with the line LL (hereafter, the game object Ob is referred to as "intersecting object").

In step S112, the marker addition target identifier 115 identifies the position at which the line LL and the environment Ev intersect with each other (hereafter, the position is referred to as "intersection position") on the basis of the environment information stored in the environment information table TBL5.

In step S112, the marker addition target identifier 115 identifies, as the marker addition target, from among one or more intersecting characters, one or more intersecting objects, and one or more intersection positions, one that has the shortest distance from the virtual camera CM-1.

When the marker addition target identifier 115 identifies the marker addition target in step S112, the display controller 114 displays one or more candidate messages MC corresponding to the marker addition target, and the so message input button Bt, on the field screen GF-1 (S114).

The operation receiver 112 then receives the message MS input by the user U1 selecting the candidate message MC, or the message MS that constitutes a character string input by the user U1 operating the operation unit 140 after selecting the message input button Bt (S116).

Subsequently, the marker information generator 116 generates the marker information on the basis of the marker addition target identified by the marker addition target identifier 115 in step S12, and the message MS received through the operation receiver 112 in step S116 (S118).

Specifically, the marker information generator 116 first creates a new record in the marker information management table TBL6 in step S118.

Next, the marker information generator 116 sets the marker ID of the created record to a unique value. The marker information generator 116 sets the marker setting time of the record to the time at which the record was created. The marker information generator 116 sets the marker adding user information in the user image display information in the record, to the user ID of the user U1. The marker information generator 116 sets the marker adding user image information to the user image Gua of the user U1.

In step S118, the marker information generator 116 sets the marker image display information on the created record, to the information on the marker addition target identified in step S12 by the marker addition target identifier 115.

Specifically, the marker information generator 116 sets the marker image display information on the record, to the marker addition target characteristics information corresponding to the marker addition target.

If the marker addition target is the game character CG, the marker information generator 116 sets the marker image display information on the record, to the game character ID identified in step S112 by the marker addition target identifier 115. In this case, the marker information generator 116 may refer to the game character management information stored in the game character management table TBL2, and set the marker image display information on the record, to the position of the game character CG.

If the marker addition target is the game object Ob, the marker information generator 116 sets the marker image display information on the record, to the game object ID identified in step S112 by the marker addition target identifier 115. In this case, the marker information generator 116 may refer to the game object management information stored in the game object to management table TBL3, and set the marker image display information on the record, to the position of the game object Ob.

If the marker addition target corresponds to the position of a part of the environment Ev, the marker information generator 116 sets the marker image display information on the record to the position (intersection position) is identified in step S112 by the marker addition target identifier 115.

If the determination result obtained in step S106 is negative, the display controller 114 displays the player character CP on the field screen GF-1 in accordance with the operation of the user U1 received in step S104 by the operation receiver 112 (S120). For example, if the operation by the user U1 received in step S104 by the operation receiver 112 is the operation to designate the action of the player character CP, the display controller 114 displays, on the field screen GF-1, how the player character CP executes the action.

If the determination result obtained in step S102 is negative, the display controller 114 displays the field screen GF-1 (S122). In this case, the display controller 114 displays the game character CG and the game object Ob on the field screen GF-1, on the basis of the game character management information stored in the game character management table TBL2 and the game object management information stored in the game object management table TBL3.

Subsequently, the game controller 111 updates the game character to management information stored in the game character management table TBL2, the game object management information stored in the game object management table TBL3, the marker information stored in the marker information management table TBL6, and the log information stored in the log management table TBL8, on the basis of the processing results obtained in steps S118, S120, S122 and the like (S124). Here, the update of the marker information has a concept that includes both addition of the marker information to the marker information management table TBL6 and removal of the marker information from the marker information management table TBL6. In this embodiment it is assumed that the information updated in step S124, which includes the game character management information, the game object management information, the marker information and the log information, is shared information that is shared between the game device 10-1 and the game device 10-2.

The information sharing controller 113 transmits the shared information updated in step S124 by the game controller 111, to the game device 10-2 (S126).

The information sharing controller 113 receives the shared information updated in the game device 10-2, from the game device 10-2 (S128). Although details are omitted, in this embodiment it is assumed that the control unit 110 included in the game device 10-2 can execute processes analogous to those of the control unit 110 included in the game device 10-1. That is, in this embodiment it is assumed that the control unit 110 included in the game device 10-2 can execute processes analogous to those executed in steps S100 to S134 by the control unit 110 included in the game device 10-1. Consequently, for example, the game controller 111 included in the game device 10-2 can update the shared information by executing a process analogous to that in step S124 described above.

It is of note that the game controller 111 updates the game character management information, the game object management information, the marker information and the log information, which are stored in the storage unit 120 of the game device 10-1, on the basis of the shared information received by the information sharing controller 113 from the game device 10-2 in step S124, for example.

Next, the game controller 111 determines whether the shared information received in step S128 by the information sharing controller 113 from the game device 10-2 includes the marker information (S130).

If the determination result obtained in step S130 is negative, the game controller 111 proceeds to step S1134.

If the determination result in step S130 is affirmative, the display controller 114 displays various images, such as the marker image GMK and other similar images, corresponding to the marker MK added by the user U2, on the field screen GF-1, on the basis of the marker information received by the information sharing controller 113 from the game device 10-2 (S132). Specifically, in step S132, the display controller 114 displays, on the field screen GF-1, the marker image GMK representative of the marker MK added by the user U2, the message image GMS representative of the message MS input by the user U2, the user image Gua representative of the user U2, the user identifying image Gui representative of the user ID of the user U2, and to the distance image Gds representative of the distance between the marker MK added by the user U2 and the player character CP.

Next, the game controller 111 determines whether the predetermined game finish condition is satisfied (S134). In this embodiment, the game finish condition is partial or complete achievement of a predetermined mission, determination of incapability of achieving the predetermined mission, incapability of continuing the battle game by the player character CP, a lapse of a predetermined time period from the start of the battle game, defeating all the enemy characters CE present in the field Fd, and other similar conditions.

If the determination result obtained in step S134 is affirmative, the game controller 111 finishes the processing shown in FIG. 13. If the determination result obtained in step S134 is negative, the game controller 111 proceeds to step S102.

5. CONCLUSION OF EMBODIMENTS

As described above, in this embodiment, the user U adds the marker MK to the marker addition target by designating the direction VL of the laser beam Ls, thereby allowing the position of the marker addition target to be transmitted to another user U. Consequently, in this embodiment, for example, the position in the field Fd can be correctly transmitted in comparison with the case where the position in the field Fd is transmitted by a message exchange means, such as chat and the like. In other words, in view of improvement of the correctness of declaring the intention by the user to U of the game device 10, this embodiment can facilitate improvement in function that is included in the game device 10 and supports communication between the users U, in comparison with using the message exchange means as in the conventional case.

In this embodiment, the user U identifies the marker addition target by designating the direction VL of the laser beam Ls. Consequently, for example, this embodiment can reduce the load on the user U required to identify the marker addition target in comparison with the case where the marker addition target is identified by a message exchange means, such as chat and the like. In other words, in view of reduction in operation load on the user U of the game device 10, this embodiment can facilitate improvement in function that is included in the game device 10 and supports communication between the users U, in comparison with using the message exchange means as in the conventional case.

In this embodiment, when the marker MK is added to the marker addition target by the user U, the marker image GMK indicating the marker MK is displayed on the field screen GF at the display unit 31 corresponding to the game device 10 operated by another user, thereby allowing the other user U to ascertain the position of the marker addition target on the field screen GF. Consequently, for example, this embodiment can reduce the load on the other user U for confirmation of the position of the marker addition target in comparison with the case where the other user U confirms the position of the marker addition target through the character string transmitted to by a message exchange means, such as chat and the like. In other words, in view of reduction in the load for reception of information transmitted from the other user U by the user U of the game device 10, this embodiment can facilitate improvement in the function that is included in the game device 10 and supports communication between the users U, in comparison with using message exchange means as in the conventional case.

In this embodiment, when the user U adds the marker MK to the marker addition target by designating the direction VL of the laser beam Ls, the candidate message MC corresponding to the marker addition target characteristics information corresponding to the marker addition target is displayed as the message MS on the field screen GF. Consequently, for example, this embodiment can reduce the load on the user U for creation of the message MS in comparison with the case where the user U inputs the character string by operating the operation unit 140 and creates the message MS. In other words, in view of reduction in operation load on the user U of the game device 10, this embodiment can facilitate improvement in function that is included in the game device 10 and supports communication between the users U, in comparison with using the message exchange means as in the conventional case.

B. MODIFICATIONS

Each aspect described above can be changed in various ways. Specific modifications are exemplified as follows. Two or more modifications freely selected from the following examples can be to appropriately combined without mutual contradiction. For elements in the modifications exemplified below having operations and functions equivalent to those in the embodiment, symbols referred to in the above description are commonly used, and detailed description of each element is appropriately omitted.

Modification 1

In the embodiment described above, the line LL is a straight line intersecting with the virtual camera CM. However, the present invention is not limited to such an aspect. The line LL may be a straight line intersecting with the player character CP. In this case, the start point LsA of the laser beam Ls may be set at a position where the player character CP is present.

Modification 2

In the embodiment and modifications described above, the laser beam Ls is a parallel beam having a certain radius. However, the present invention is not limited to such an aspect. The laser beam Ls may have any sectional shape.

The sectional shape of the laser beam Ls may change in accordance with the game element positioned at the end point LsB of the laser beam Ls. For example, in a case where the game element positioned at the end point LsB of the laser beam Ls is the game character CG or the game object Ob, the radius of the laser beam Ls may be larger in comparison with a case where the game element positioned at the end point LsB of the laser beam Ls is the environment Ev.

The sectional shape of the laser beam Ls may be changed depending on the distance between the start point LsA and the end point LsB of the laser beam Ls. For example, the radius of the laser beam Ls may be larger in a case where the distance between the start point LsA and the end point LsB of the laser beam Ls is long, in comparison with a case where the distance is is shorter. In this case, the user U can easily add the marker MK to a game element that is far from the player character CP. For example, the radius of the laser beam Ls may be larger in a case where the distance between the start point LsA and the end point LsB of the laser beam Ls is short, in comparison with a case where the distance is longer. In this case, the user U can easily add the marker MK to the game element moving in proximity to the player character CP at high speed.

Modification 3

In the embodiment and modifications described above, the laser beam Ls is a parallel beam. However, the present invention is not limited to such an aspect. The laser beam Ls may have any shape.

Figure 14:
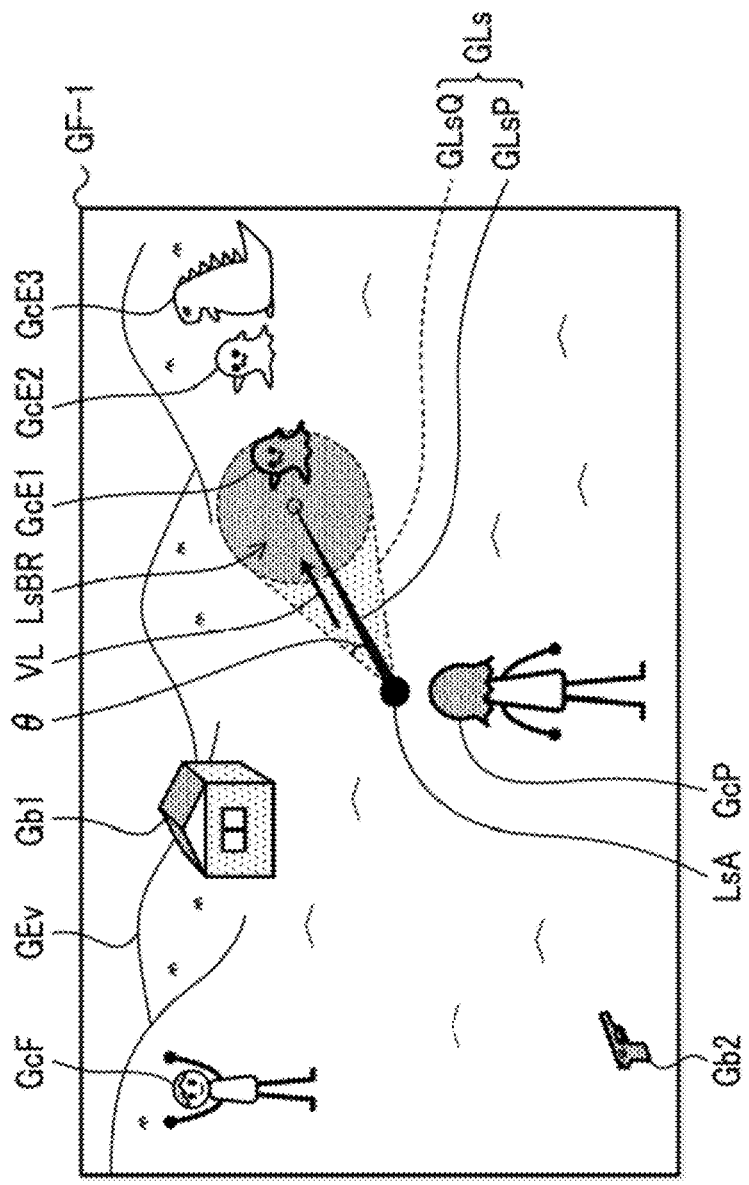
FIG. 14 illustrates an example of a field screen GF-1 according to Modification 3.

FIG. 14 shows an example of the laser beam Ls according to this modification. As shown in FIG. 14, the laser beam Ls according to this modification is a diffuse beam that diffuses substantially conically. The start point LsA is the vertex and the end point area LsBR is a base.

In the example shown in FIG. 14, the laser beam image GLs representative of the laser beam Ls includes a laser beam image GLsP and a laser beam image GLsQ. In a case where the laser beam Ls travels while to conically diffusing, for example, the laser beam image GLsP represents the laser beam LsP that travels in the direction of the central axis of the cone, and the laser beam image GLsQ represents the laser beam LsQ that travels along the external periphery of the laser beam Ls.

In the example shown in FIG. 14, the user U can select, as the marker addition target, the game element positioned in the end point area LsBR of the laser beam Ls. Accordingly, in the example shown in FIG. 14, the user U can select the marker addition target from among the game elements present in a wider area, in comparison with the case where the laser beam Ls is a parallel beam.

In the example shown in FIG. 14, the laser beam image GLs is only required to include at least one of the laser beam image GLsP and the laser beam image GLsQ.

In the example shown in FIG. 14, the diffuse angle θ that is the angle between the laser beam LsP and the laser beam LsQ may change in accordance with the game element positioned in the end point area LsBR of the laser beam Ls. For example, in a case where the game element positioned in the end point area LsBR of the laser beam Ls is the game character CG or the game object Ob, the diffuse angle θ may be larger in comparison with a case where the game element positioned in the end point area LsBR of the laser beam Ls is the environment Ev.

In the example shown in FIG. 14, the diffuse angle θ may be changed depending on the distance between the start point LsA and the end point area LsBR of the laser beam Ls. For example, in a case where the distance between the start point LsA and the end point area LsBR of the laser beam Ls is long, the diffuse angle θ may be larger in comparison with a case where the distance is short. In this case, the user U can easily add the marker MK to a game element that is far from the player character CP. For example, in a case where the distance between the start point LsA and the end point area LsBR of the laser beam Ls is short, the diffuse angle θ may be larger in comparison with a case where the distance is long. In this case, the user U can easily add the marker MK to the game element moving in proximity to the player character CP at high speed.

The shape of the laser beam Ls may be changed depending on the distance (i.e., the length of the laser beam Ls) between the start point LsA and the end point LsB (or the end point area LsBR) of the laser beam Ls. For example, if the length of the laser beam Ls is equal to or less than a predetermined length, the laser beam Ls may be a parallel beam. If the length of the laser beam Ls is longer than the predetermined length, the laser beam Ls may be a diffuse beam. For example, if the length of the laser beam Ls is equal to or longer than a predetermined length, the laser beam Ls may be a parallel beam. If the length of the laser beam Ls is less than the predetermined length, the laser beam Ls may be a diffuse beam.

Modification 4

In the embodiment and modifications described above, when the game element irradiated with the laser beam Ls satisfies a predetermined condition, the game element may be displayed in intensified highlighted manner. Here, the predetermined condition may be a condition that the game element is the game character CG or the game object Ob, or a condition that the game element is movable in the field Fd.

Modification 5

In the embodiment and modifications described above, when the user U adds the marker MK to the marker addition target, the display unit 31 corresponding to the game device 10 operated by another user U displays, on the field screen GF, the marker image GMK, the message image GMS, the user image Gua, the user identifying image Gui and the distance image Gds. However, the present invention is not limited to such an aspect. The display unit 31 corresponding to the game device 10 operated by the other user U may display, on the field screen GF, at least the marker image GMK. In this case, the user U adding the marker MK is only required to designate at least the direction VL of the laser beam Ls to identify the marker addition target. The user U is not required to input the message MS.

Modification 6

In the embodiment and modifications described above, the marker image GMK is displayed in the field screen GF representative of the field Fd. However, the present invention is not limited to such an aspect. For example, the marker image GMK may be displayed in a map screen representative of a map of the field Fd.

Modification 7

In the embodiment and modifications described above, the battle game to is executed in the game device 10. However, the present invention is not limited to such aspects. The game may be executed in any device other than the game device 10.

Figure 15:
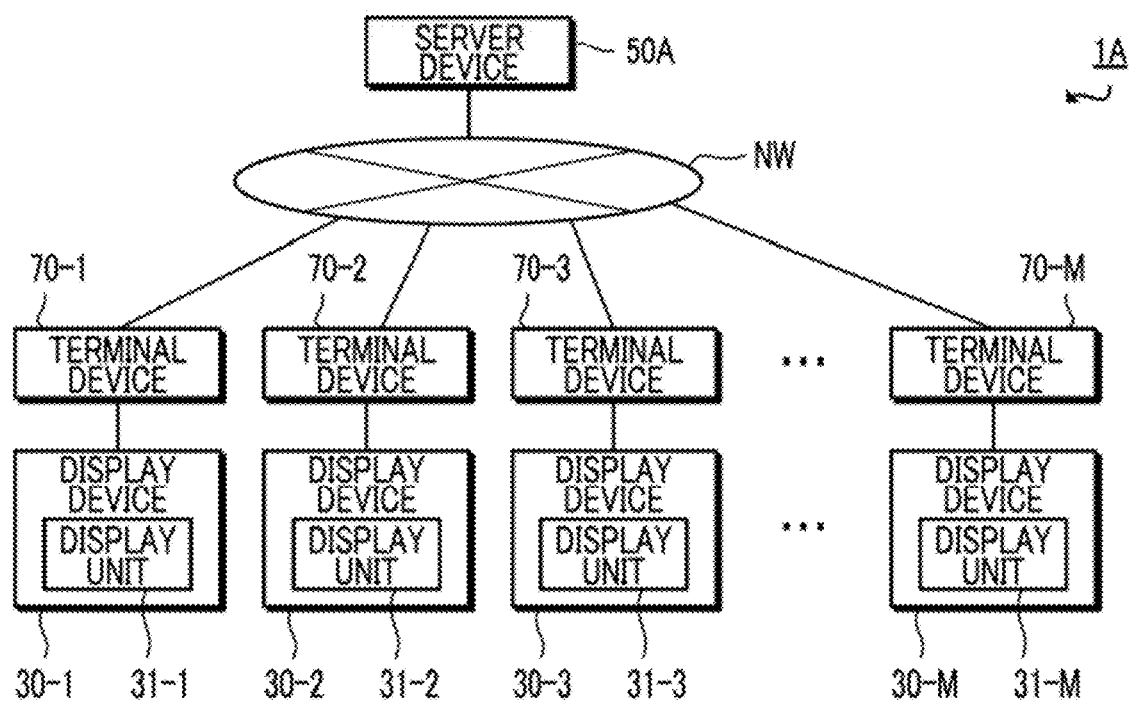
FIG. 15 illustrates an overview of a game system 1A according to Modification 7.

FIG. 15 illustrates an overview of a game system 1A according to this modification. The game system 1A includes multiple terminal devices 70 (70-1 to 70-M), display devices 30 (30-1 to 30-M) corresponding to the respective terminal devices 70, and a server device 50A. The server device 50A can execute the battle game, and can communicate with each terminal device 70 via a network NW.

Figure 16:
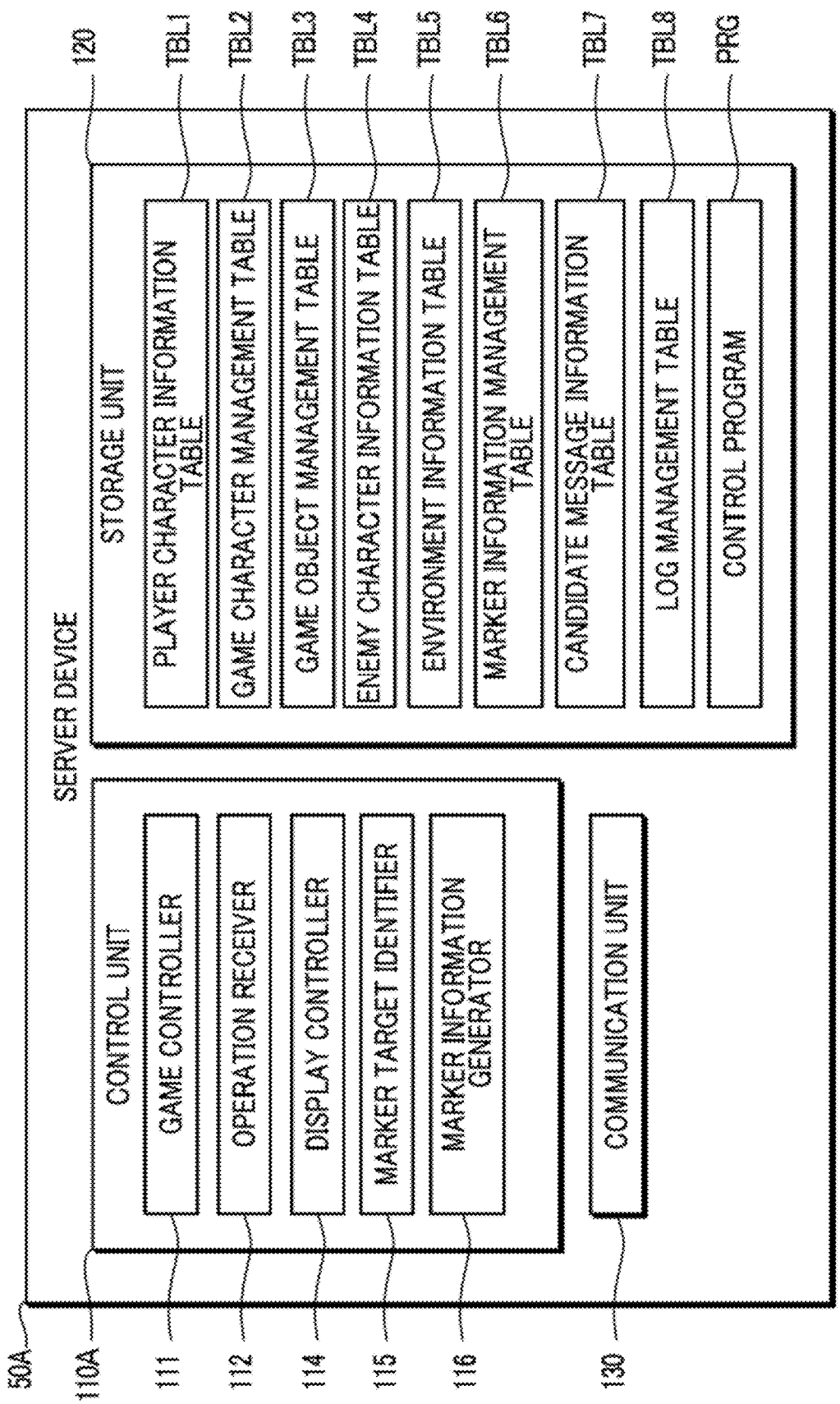
FIG. 16 is a block diagram showing an example of the configuration of a server device 50A according to Modification 7.

FIG. 16 is a functional block diagram showing an example of the configuration of the server device 50A according to this modification. As shown in FIG. 16, the server device 50A includes a control unit 110A, a storage unit 120, and a communication unit 130. The control unit 110A included in the server device 50A is analogous to the control unit 110 according to the embodiment shown in FIG. 2, except that the information sharing controller 113 is not included.

The display controller 114 included in the server device 50A generates display information for the battle game, and supplies the generated display information to the terminal devices 70 via the communication unit 130. A terminal device 70 causes the display unit 31 of the display device 30 to display a screen based on the display information supplied from the server device 50A.

The operation receiver 112 included in the server device 50A obtains from the terminal device 70, via the communication unit 130, the operation details input by the user U of the terminal device 70.

C. APPENDIX

According to the above description, the present invention is understood as follows, for example. To facilitate understanding of each aspect, in the following description, reference signs of the diagrams are parenthesized and added for the convenience. However, there is no intention to limit to the present invention to the illustrated aspects.

APPENDIX 1

A recording medium according to an aspect of the present invention is a non-transitory computer readable recording medium having recorded thereon a program, the program causing a processor (e.g., a processor 1000) of a game device (e.g., a game device 10) to function as: an identifier (e.g., a marker addition target identifier 115) configured to identify a game element in a virtual space, or a position of the game element in the virtual space, based on an indicated direction in the virtual space in accordance with an operation input performed by a user; and a generator (e.g., a marker information generator 116) configured to generate first information to enable a position designation image to be displayed on a display unit, a position designation image representative of the position in the virtual space depending on an identification result obtained from the identifier.

In this aspect, on the basis of the first information generated by the generator, there can be displayed, on the display unit, the position designation image representative of the position in the virtual space based on the indicated to direction in accordance with the operation input performed by the user. Consequently, in this aspect, for example, the user can correctly transmit the position in the virtual space, in comparison with the case where the position in the virtual space is represented by a character string.

In this aspect, the user can designate the position in the virtual space by operating the indicated direction in the virtual space. Consequently, according to this aspect, for example, the load for designation of the position in the virtual space by the user can be reduced, in comparison with the case where the user designates the position in the virtual space in a character string to represent the position in the virtual space.

In the aspect described above, "virtual space" is, for example, a virtual space provided for the game executed by the game device. The "virtual space" may be, for example, a three-dimensional space, or a two-dimensional space.

In the aspect described above, "indicated direction" may be, for example, a direction in the virtual space when viewed from a player character that is present in the virtual space and is operated in accordance with an operation input performed by the user from an input device. The "indicated direction" may be, for example, a direction in the virtual space when viewed from the virtual camera when a field image of the virtual space viewed from the virtual camera is displayed.

In the aspect described above, "game element" may be, for example, to the environment component that constitutes the environment in the virtual space. Here, examples of "environment components" include mountains, grass, trees, rocks, ground, clouds and the like that are present in the virtual space. The "game element" may be, for example, a game object present in the virtual space. Here, examples of "game object" include, for example, buildings, tools, vehicles weapons and the like which are present in the virtual space. The "game element" may be, for example, a character that is present in the virtual space and is other than the player character operated in accordance with an operation input performed by the user from the input device. Here, "character other than the player character" may be, for example, an enemy character that is in a hostile relationship to the player character in the game, or a friend character that is in a cooperative relationship with the player character in the game.

In the aspect described above, "position designation image" may be, for example, an image that includes information capable of identifying the position in the virtual space. Here, the "image that includes information capable of identifying the position in the virtual space" may be, for example, an image serving as a mark provided at a position to be identified in the field image representative of the virtual space. The "information capable of identifying the position in the virtual space" may be, for example, a character string that represents the distance to the position to be identified from the position where the player character operated in accordance with the the operation input performed by the user from the input device is present in the virtual space, the direction, or the difference in altitude or the like.

APPENDIX 2

The recording medium according to another aspect of the present invention is the recording medium according to appendix 1, in which the game device is configured to be able to communicate with another game device, and in which the first information is information for causing the other game device to display, on the display unit, the position designation image at a position corresponding to the game element in a first field image representative of the virtual space.

In this aspect, the other game device displays, on the display unit, the position designation image representative of the position in the virtual space based on the indicated direction in accordance with the operation input performed by the user. Consequently, in this aspect, for example, the game device can correctly transmit the position in the virtual space to the other user operating the other game device, in comparison with the case where a character string representative of the position in the virtual space is displayed on the display unit.

APPENDIX 3

The recording medium according to another aspect of the present invention is the recording medium according to appendix 1 or 2, in which the identifier is configured to identify a game element intersecting with a line extending in the indicated direction, or a position of a game element intersecting with the line, in the virtual space.

In this aspect, the user can designate the position in the virtual space using the line extending in the indicated direction in the virtual space. Consequently, in this aspect, for example, the user can correctly transmit the position in the virtual space, and the load for designation of the position in the virtual space by the user can be reduced, in comparison with the case where the user designates the position in the virtual space in a character string representing the position in the virtual space.

In the aspect described above, "line" may be, for example, a line intersecting with a perspective of the player character that is present in the virtual space and is operated in accordance with an operation input performed by the user from an input device. The "line" may be, for example, a line that intersects with the virtual camera when a field image of the virtual space viewed from the virtual camera is displayed.

In the aspect described above, "game element intersecting with a line" may be, for example, a game element that intersects with the line for the first time, with the viewpoint of the player character or the virtual camera being adopted as the point of origin.

APPENDIX 4

The recording medium according to another aspect of the present invention is the recording medium according to appendix 3, in which the program causes the processor to function further as a display controller (e.g., a display controller 114) configured to cause a second field image representative of the virtual space to be displayed, and cause a line image representative of a part of the line or the entire line to be displayed in the second field image.

In this aspect, the user can designate the position in the virtual space while referring to the image of the line displayed in the virtual space. Consequently, in this aspect, for example, the load for designation of the position in the virtual space by the user can be reduced, in comparison with the case where the image of the line in the virtual space is not displayed.

In the aspect described above, "image of the line" may be, for example, an image representative of a laser beam emitted from the player character, the virtual camera or the like.

APPENDIX 5

The recording medium according to another aspect of the present invention is the recording medium according to appendix 4, in which the display controller is configured to cause an image representative of the virtual space when viewed from a virtual camera to be displayed as the second field image, and in which the line intersects with the virtual camera.

In this aspect, the user can designate the position in the virtual space using the line intersecting with the virtual camera. Consequently, in this aspect, for example, the load for designation of the position in the virtual to space by the user is reduced, in comparison with the case where the user designates the position in the virtual space using a line that does not intersect with the virtual camera.

APPENDIX 6

The recording medium according to another aspect of the present invention is the recording medium according to any one of appendixes 1 to 5, in which the program causes the processor to function further as an input receiver (e.g., an operation receiver 112) configured to receive an input of a designation message associated with the game element, based on an operation input performed by the user, and in which, the generator is configured to generate second information to enable the designation message to be displayed on the display unit.

In this aspect, the designation message can be displayed on the display unit. Consequently, for example, the user can transmit the meaning or purpose of designating the position in the virtual space.

In the aspect described above, "designation message" may be, for example, a message freely input by the user through the input device, or a message selected based on an operation input made by the user from among one or more predetermined candidate messages. The "designation message" may be, for example, a message indicating the role of the game element or the position of the game element in the game executed by the game device. The "designation message" may be, for example, a message indicating the to relationship between the progress of the game and the game element or the position of the game element. The "designation message" may be, for example, a message indicating the importance of the game element or the position of the game element in the progress of the game. The "designation message" may be, for example, a message indicating the relationship between the player character and the game element or the position of the game element.

APPENDIX 7

The recording medium according to another aspect of the present invention is the recording medium according to appendix 6, in which, the program causes the processor to function further as a display controller (e.g., a display controller 114) configured to cause a plurality of candidate messages to be displayed when the identifier identifies the game element in the virtual space or the position of the game element in the virtual space, and in which the input receiver is configured to receive an input of one candidate message selected as the designation message from among the candidate messages, based on the operation input performed by the user.

In this aspect, the user selects the designation message from among the candidate messages. Consequently, for example, the load for the input of the designation message by the user can be reduced, in comparison with the case of input of the character string constituting the designation message.

In the aspect described above, "candidate message" may be, for example, a message indicating the role of the game element or the position of the game element in the game executed by the game device. The "candidate message" may be, for example, a message indicating the relationship between the progress of the game and the game element or the position of the game element. The "candidate message" may be, for example, a message indicating the importance of the game element or the position of the game element in the progress of the game. The "candidate message" may be, for example, a message indicating the relationship between the player character and the game element or the position of the game element.

APPENDIX 8

The recording medium according to another aspect of the present invention is the recording medium according to any one of appendixes 1 to 7, in which the generator is configured to generate third information to enable a user identification image for identifying the user to be displayed on the display unit in association with the position designation image.

In this aspect, the user identification image can be displayed on the display unit. Consequently, for example, the other user can identify the user designating the position in the virtual space.

In the aspect described above, the "user identification image" may be an image including information allowing one or more users playing the game to be identified. Here, the "image including information allowing users to be identified" may be, for example, any image selected by the user, or the user's face photo. The "image including information allowing users to be to identified" may be, for example, a character string representative of the name of the user, or a character string representative of a nickname of the user.

APPENDIX 9

The recording medium according to another aspect of the present invention is the recording medium according to any one of appendixes 1 to 8, in which the program causes the processor to function further as a history manager (e.g., a game controller 111) configured to generate fourth information to enable a history related to events to be displayed on the display unit, the events having occurred in the virtual space, and in which the events include identification, by the identifier, of the game element in the virtual space or the position of the game element in the virtual space.

In this aspect, the history related to the events can be displayed on the display unit. Consequently, for example, when the position in the virtual space is designated multiple times, the multiple times of designation can be listed and confirmed.

In the aspect described above, the "event(s)" may be, for example, events related to the progress of the game executed by the game device, an event relating to the action or state of the player character, or an event relating to information exchange between users playing the game. Here, the "event relating to the action of the player character" may be, for example, that the player character performs a predetermined action. The "event relating to the state of the player character" may be, for example, that the skill level of the to player character varies, continuation of the game by the player character becomes difficult or the like.

APPENDIX 10

The recording medium according to another aspect of the present invention is the recording medium according to any one of appendixes 1 to 9, in which the game element is movable in the virtual space, and in which when the game element is moving in the virtual space, the first information indicates a position at which the game element is located while moving in the virtual space.

In this aspect, the user can correctly transmit the position of the game element moving in the virtual space.

APPENDIX 11

A game device (e.g., a game device 10) according to an aspect of the present invention includes: an identifier (e.g., a marker addition target identifier 115) configured to identify a game element in a virtual space or a position of the game element in the virtual space, based on an indicated direction in the virtual space in accordance with an operation input performed by a user, and a generator (e.g., a marker information generator 116) configured to generate first information to enable a position designation image to be displayed on the display unit, a position designation image representative of a position in the virtual space depending on an identification result from the identifier.

In this aspect, the user can correctly transmit the position in the virtual space, and the load for the designation of the position in the virtual space by the user can be reduced.

APPENDIX 12

A game system (e.g., a game system 1) according to an aspect of the present invention is a game system including a first game device (e.g., a game device 10-1), and a second game device (e.g., a game device 10-2) configured to communicate with the first game device, in which the first game device includes: an identifier (e.g., a marker addition target identifier 115) configured to identify a game element in a virtual space or a position of the game element in the virtual space, based on an indicated direction in the virtual space in accordance with an operation input performed by a user; and a generator (e.g., a marker information generator 116) configured to generate first information to enable a position designation image to be displayed on a display unit, a position designation image representative of a position in the virtual space depending on an identification result obtained from the identifier, and in which the second game device is configured to cause the position designation image to be displayed on the display unit, based on the first information.

In this aspect, the user can correctly transmit the position in the virtual space, and the load for the designation of the position in the virtual space by the user can be reduced.

DESCRIPTION OF REFERENCE SIGNS

1 . . . Game system, 10 . . . Game device, 30 . . . Display device, 110 . . . Control unit, 111 . . . Game controller, 112 . . . Operation receiver, 113 . . . Information sharing controller, 114 . . . Display controller, 115 . . . Marker addition target identifier, 116 . . . Marker information generator, 120 . . . Storage unit, 130 . . . Communication unit, 140 . . . Operation unit, 150 . . . Information reading unit, 1000 . . . Processor.

What is claimed is:

1. A non-transitory computer readable recording medium having recorded thereon a program for a first game device having a processor, the program causing the processor to:
   identify a game element in a virtual space, or a position of the game element in the virtual space, based on an indicated direction in the virtual space in accordance with an operation input made by a user of the first game device; and
   generate first information to enable a position designation image to be displayed on a display unit, the position designation image being representative of the position in the virtual space depending on an identification result obtained by identifying the game element or the position of the game element,
   wherein the first game device is configured to communicate with a second game device,
      wherein the display unit corresponds to the second game device, and
      wherein the first information is generated to display, on the display unit that corresponds to the second game device, the position designation image at a position that corresponds to the identified game element in the virtual space.

2. The recording medium according to claim 1, wherein the program causes the processor to identify a game element intersecting with a line extending in the indicated direction, or a position of a game element intersecting with the line, in the virtual space.

3. The recording medium according to claim 2, wherein the program causes the processor to display a second field image representative of the virtual space, and to display a line image representative of a part of the line or the entire line in the second field image.

4. The recording medium according to claim 3,
   wherein the program causes the processor to display, as the second field image, an image representative of the virtual space when viewed from a virtual camera, and
   wherein the line intersects with the virtual camera.

5. The recording medium according to claim 1,
   wherein the program causes the processor to receive an input of a designation message associated with the game element, based on an operation input made by the user, and
   wherein the program causes the processor to generate second information to enable the designation message to be displayed on the display unit that corresponds to the second game device.

6. The recording medium according to claim 5,
   wherein the program causes the processor to display a plurality of candidate messages when either the game element in the virtual space or the position of the game element in the virtual space is identified, and
   wherein the program causes the processor to receive an input of one candidate message selected as the designation message from among the candidate messages, based on the operation input made by the user.

7. The recording medium according to claim 1,
   wherein the program causes the processor to generate third information to enable a user identification image for identifying the user to be displayed on the display unit that corresponds to the second game device in association with the position designation image.

8. The recording medium according to claim 1,
   wherein the program causes the processor to generate fourth information to enable a history related to events to be displayed on the display unit that corresponds to the second game device, the events having occurred in the virtual space, and
   wherein the events include identification of the game element in the virtual space or the position of the game element in the virtual space.

9. The recording medium according to claim 1,
   wherein the game element is movable in the virtual space, and
   wherein when the game element is moving in the virtual space, the first information indicates a position at which the game element is located while moving in the virtual space.

10. The recording medium according to claim 1, wherein the indicated direction comprises a direction in which a laser beam travels in the virtual space.

11. The recording medium according to claim 1, wherein the indicated direction is displayed in the virtual space.

12. A game device comprising:
a processor; and
a memory that is operatively coupled to the processor and is configured to store instructions executed by the processor,
wherein upon execution of the instructions the processor is configured to:
   identify a game element in a virtual space or a position of the game element in the virtual space, based on an indicated direction in the virtual space in accordance with an operation input made by a user of the game device; and
   generate first information to enable a position designation image to be displayed on a display unit, the position designation image being representative of a position in the virtual space depending on an identification result obtained by identifying the game element or the position of the game element,
wherein the game device is configured to communicate with another game device,
wherein the display unit corresponds to the another game device, and
wherein the first information is generated to display, on the display unit that corresponds to the another game device, the position designation image at a position that corresponds to the identified game element in the virtual space.

13. The game device according to claim 12, wherein the indicated direction comprises a direction in which a laser beam travels in the virtual space.

14. The game device according to claim 12, wherein the indicated direction is displayed in the virtual space.

15. A game system comprising:
a first game device, and
a second game device configured to communicate with the first game device,
wherein the first game device includes:
   a processor; and
   a memory that is operatively coupled to the processor and is configured to store instructions executed by the processor,
   wherein upon execution of the instructions the processor is configured to:
      identify a game element in a virtual space or a position of the game element in the virtual space, based on an indicated direction in the virtual space in accordance with an operation input made by a user; and
      generate first information to enable a position designation image to be displayed on the second game device, the position designation image being representative of a position in the virtual space depending on an identification result obtained by identifying the game element or the position of the game element, and
wherein the second game device is configured to display the position designation image at a position that corresponds to the identified game element in the virtual space, based on the first information.

16. The game system according to claim 15, wherein the indicated direction comprises a direction in which a laser beam travels in the virtual space.

17. The game system according to claim 15, wherein the indicated direction is displayed in the virtual space.

18. The game system according to claim 15, wherein a first player character controlled by the first game device and a second player character controlled by the second game device cooperate with each other in a game in the virtual space.

19. The game system according to claim 18, wherein the first player character and the second player character are both displayed at a same time in the virtual space.

* * * * *